United States Patent
Janakiraman et al.

(10) Patent No.: US 11,030,240 B1
(45) Date of Patent: Jun. 8, 2021

(54) SYSTEMS AND METHODS FOR EFFICIENTLY SENDING VIDEO METADATA

(71) Applicant: Honeywell International Inc., Morris Plains, NJ (US)

(72) Inventors: Kirupakar Janakiraman, Madurai (IN); Baskaran Muthusamy, Bangalore (IN); Keyurbhai Patel, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/792,852

(22) Filed: Feb. 17, 2020

(51) Int. Cl.
| | |
|---|---|
| *G06F 3/00* | (2006.01) |
| *G06F 13/00* | (2006.01) |
| *H04N 5/445* | (2011.01) |
| *G06F 16/71* | (2019.01) |
| *H04N 21/2743* | (2011.01) |
| *G06N 20/00* | (2019.01) |
| *G06F 16/78* | (2019.01) |
| *H04N 21/266* | (2011.01) |

(52) U.S. Cl.
CPC .......... *G06F 16/71* (2019.01); *G06F 16/7867* (2019.01); *G06N 20/00* (2019.01); *H04N 21/26603* (2013.01); *H04N 21/2743* (2013.01)

(58) Field of Classification Search
CPC ..... G06F 16/71; G06F 16/7867; G06N 20/00; H04N 21/26603; H04N 21/2743
See application file for complete search history.

(56) References Cited

U.S. PATENT DOCUMENTS

| | | |
|---|---|---|
| 7,996,771 B2 | 8/2011 | Girgensohn et al. |
| 8,457,354 B1 | 6/2013 | Kolar et al. |
| 8,890,655 B2 | 11/2014 | Pederson |
| 9,087,386 B2 | 7/2015 | Morris et al. |
| 9,247,211 B2 | 1/2016 | Zhang et al. |
| 9,286,777 B2 | 3/2016 | Vallone et al. |

(Continued)

FOREIGN PATENT DOCUMENTS

| | | |
|---|---|---|
| CN | 103733196 A | 4/2014 |
| WO | 2012092150 A2 | 7/2012 |

OTHER PUBLICATIONS

Extended European search report for corresponding EP application 18155934.5, dated Aug. 27, 2018.

(Continued)

*Primary Examiner* — Kyu Chae
(74) *Attorney, Agent, or Firm* — Seager, Tufte & Wickhem, LLP

(57) ABSTRACT

A video management system may send time-stamped metadata corresponding to a video stream across a communication path having a limited bandwidth. Time-stamped metadata for a first reference video frame which identifies objects in the reference frame may be generated, and sent across the communication path. Time-stamped metadata for each of a plurality of first delta video frames following the first reference video frame may be generated, the time-stamped metadata for each of the plurality of first delta video frames may identify changes in detected objects relative to the objects identified in the time-stamped metadata for the first reference video frame. The time-stamped metadata for each of the plurality of first delta video frames may be sent across the communication path.

20 Claims, 17 Drawing Sheets

(56) References Cited

U.S. PATENT DOCUMENTS

| | | |
|---|---|---|
| 9,317,751 B2 | 4/2016 | Li et al. |
| 9,495,754 B2 | 11/2016 | Oami et al. |
| 2001/0049826 A1 | 12/2001 | Wilf |
| 2005/0246373 A1 | 11/2005 | Faulkner et al. |
| 2007/0098303 A1 | 5/2007 | Gallagher et al. |
| 2007/0132767 A1 | 6/2007 | Wright et al. |
| 2009/0144772 A1* | 6/2009 | Fink ............... H04N 21/812 |
| | | 725/42 |
| 2010/0235535 A1 | 9/2010 | Zhu |
| 2010/0287161 A1 | 11/2010 | Naqvi |
| 2010/0296742 A1 | 11/2010 | Chandrasekaran et al. |
| 2012/0062732 A1 | 3/2012 | Marman et al. |
| 2012/0167146 A1* | 6/2012 | Incorvia ............ H04N 21/4725 |
| | | 725/60 |
| 2013/0039634 A1 | 2/2013 | M |
| 2013/0091432 A1 | 4/2013 | Shet et al. |
| 2013/0226758 A1 | 8/2013 | Reitan |
| 2013/0229433 A1 | 9/2013 | Reitan |
| 2013/0321647 A1 | 12/2013 | Khawand et al. |
| 2013/0332545 A1 | 12/2013 | Primus et al. |
| 2014/0067875 A1 | 3/2014 | Martinez et al. |
| 2014/0071287 A1 | 3/2014 | Tu et al. |
| 2015/0113018 A1 | 4/2015 | Steed et al. |
| 2015/0134668 A1* | 5/2015 | Popovich ............ G06F 16/7867 |
| | | 707/741 |
| 2015/0181164 A1 | 6/2015 | Yang et al. |
| 2015/0248710 A1 | 9/2015 | Medvedovsky et al. |
| 2015/0312190 A1 | 10/2015 | Rankin et al. |
| 2015/0326925 A1* | 11/2015 | Ozkan ............... H04N 21/858 |
| | | 725/36 |
| 2016/0155063 A1 | 6/2016 | Rich |
| 2016/0203386 A1 | 7/2016 | Porecki et al. |
| 2018/0357247 A1 | 12/2018 | Siminoff et al. |
| 2019/0014289 A1 | 1/2019 | Renkis |

OTHER PUBLICATIONS

Scientific Working Group on Digital Evidence-Best Practices for Computer Forensics, Version 2.1, Jul. 2006.

Scientific Working Group Imaging Technology, Section 7-Best Practices for Forensic Video Analysis, Version 1.0, Jan. 16, 2009.

Lee et al., "STRG-QL: Spatio-temporal region graph query language for video databases," The International Society for Optical Engineering, 13 pages, Jan. 2008.

Wang et al., "Videos as Space-Time Region Graphs," Robotics Institute of Carnegie Mellon University, 19 pages, 2018.

Galmar et al., "Graph-Based Spatio-temporal Region Extraction," 12 pages, 2006.

Lee et al., "STRG-Index: Spatio-Temporal Region Graph Indexing for Large Video Databases," Department of Computer Science and Engineering at University of Texas, 12 pages, 2005.

Lee et al., "A Graph-Based Approach for Modeling and Indexing Video Data," Department of Computer Science and Engineering, 8 pages, accessed Nov. 3, 2020.

"Best Practices for Forensic Image Analysis," FBI, 7 pages, Mar. 14, 2005.

\* cited by examiner

SYSTEMS AND METHODS FOR EFFICIENTLY SENDING VIDEO METADATA

CROSS REFERENCE TO RELATED APPLICATIONS

The present application is related to U.S. application Ser. No. 16/792,818, filed on Feb. 17, 2020, titled SYSTEMS AND METHODS FOR SEARCHING FOR EVENTS WITHIN VIDEO CONTENT, and U.S. application Ser. No. 16/792,860, filed on Feb. 17, 2020, titled SYSTEMS AND METHODS FOR IDENTIFYING EVENTS WITHIN VIDEO CONTENT USING INTELLIGENT SEARCH QUERY.

TECHNICAL FIELD

The present disclosure relates generally to video management systems, and more particularly, to video management systems that utilize intelligent video queries.

BACKGROUND

Known video management systems (VMS) used in security surveillance and the like can include a plurality of cameras. In some cases, video management systems are used to monitor areas such as, for example, banks, stadiums, shopping centers, airports, and the like. In some cases, video management systems may store captured video content locally and/or remotely, sometimes using one or more video management servers. Searching the video content for one or more events can be resource intensive. What would be desirable is a more efficient way of capturing, organizing and/or processing video content to help identify one or more events in the captured video.

SUMMARY

The present disclosure relates generally to video management systems, and more particularly, to video management systems that provide a more efficient way of capturing, organizing and/or processing video content to help identify one or more events in the captured video.

In one example, a method for sending time-stamped metadata corresponding to a video stream across a communication path having a limited bandwidth, the video stream including a plurality of sequential video frames may include generating time-stamped metadata for a first reference video frame of the plurality of sequential video frames of the video stream, the time-stamped metadata for the first reference video frame may identify objects detected in the first reference video frame. The time-stamped metadata for the first reference video frame may be sent across the communication path. Time-stamped metadata for each of a plurality of first delta video frames following the first reference video frame may be generated, the time-stamped metadata for each of the plurality of first delta video frames may identify changes in detected objects relative to the objects identified in the time-stamped metadata for the first reference video frame. The time-stamped metadata for each of the plurality of first delta video frames may be sent across the communication path. Time-stamped metadata for a second reference video frame of the plurality of sequential video frames of the video stream may be generated, the second reference video frame following the plurality of first delta video frames, the time-stamped metadata for the second reference video frame may identify objects detected in the second reference video frame. The time-stamped metadata for the second reference video frame may be sent across the communication path. Time-stamped metadata for each of a plurality of second delta video frames following the second reference video frame may be generated, the time-stamped metadata for each of the plurality of second delta video frames may identify changes in detected objects relative to the objects identified in the time-stamped metadata for the second reference video frame, and the time-stamped metadata for each of the plurality of second delta video frames may be sent across the communication path.

In another example, a video processing system for sending time-stamped metadata corresponding to a video stream across a communication path having a limited bandwidth, the video stream including a plurality of sequential video frames may include a memory, and one or more processor operatively coupled to the memory, which may be configured to: generate time-stamped metadata for a first reference video frame of the plurality of sequential video frames of the video stream, the time-stamped metadata for the first reference video frame may identify objects detected in the first reference video frame. The one or more processors may be configured to store the time-stamped metadata for the first reference video frame in the memory, send the time-stamped metadata for the first reference video frame across the communication path, generate time-stamped metadata for each of a plurality of first delta video frames following the first reference video frame, the time-stamped metadata for each of the plurality of first delta video frames may identify changes in detected objects relative to the objects identified in the time-stamped metadata for the first reference video frame, store the time-stamped metadata for each of the plurality of first delta video frames in the memory, and send the time-stamped metadata for each of the plurality of first delta video frames across the communication path. The one or more processors may further be configured to generate time-stamped metadata for a second reference video frame of the plurality of sequential video frames of the video stream, the second reference video frame following the plurality of first delta video frames, the time-stamped metadata for the second reference video frame may identify objects detected in the second reference video frame, store the time-stamped metadata for the second reference video frame in the memory, send the time-stamped metadata for the second reference video frame across the communication path, generate time-stamped metadata for each of a plurality of second delta video frames following the second reference video frame, the time-stamped metadata for each of the plurality of second delta video frames may identify changes in detected objects relative to the objects identified in the time-stamped metadata for the second reference video frame, store the time-stamped metadata for each of the plurality of second delta video frames in the memory, and send the time-stamped metadata for each of the plurality of second delta video frames across the communication path.

In another example, a method for receiving time-stamped metadata corresponding to a video stream across a communication path having a limited bandwidth, the video stream including a plurality of sequential video frames may include, receiving time-stamped metadata for a first reference video frame of the plurality of sequential video frames of the video stream, the time-stamped metadata for the first reference video frame may identify objects detected in the first reference video frame. The time-stamped metadata for each of a plurality of first delta video frames following the first reference video frame may be received, the time-stamped metadata for each of the plurality of first delta video frames may identify changes in detected objects relative to the objects identified in the time-stamped metadata for the first reference video frame. The method may include receiving time-stamped metadata for a second reference video frame of the plurality of sequential video frames of the video stream, the second reference video frame following the plurality of first delta video frames, the time-stamped metadata for the second reference video frame may identify objects detected in the second reference video frame. Time-stamped metadata for each of a plurality of second delta video frames following the second reference video frame may be received, the time-stamped metadata for each of the plurality of second delta video frames may identify changes in detected objects relative to the objects identified in the time-stamped metadata for the second reference video frame, and the received time-stamped metadata to identify one or more events in the video stream may be processed.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
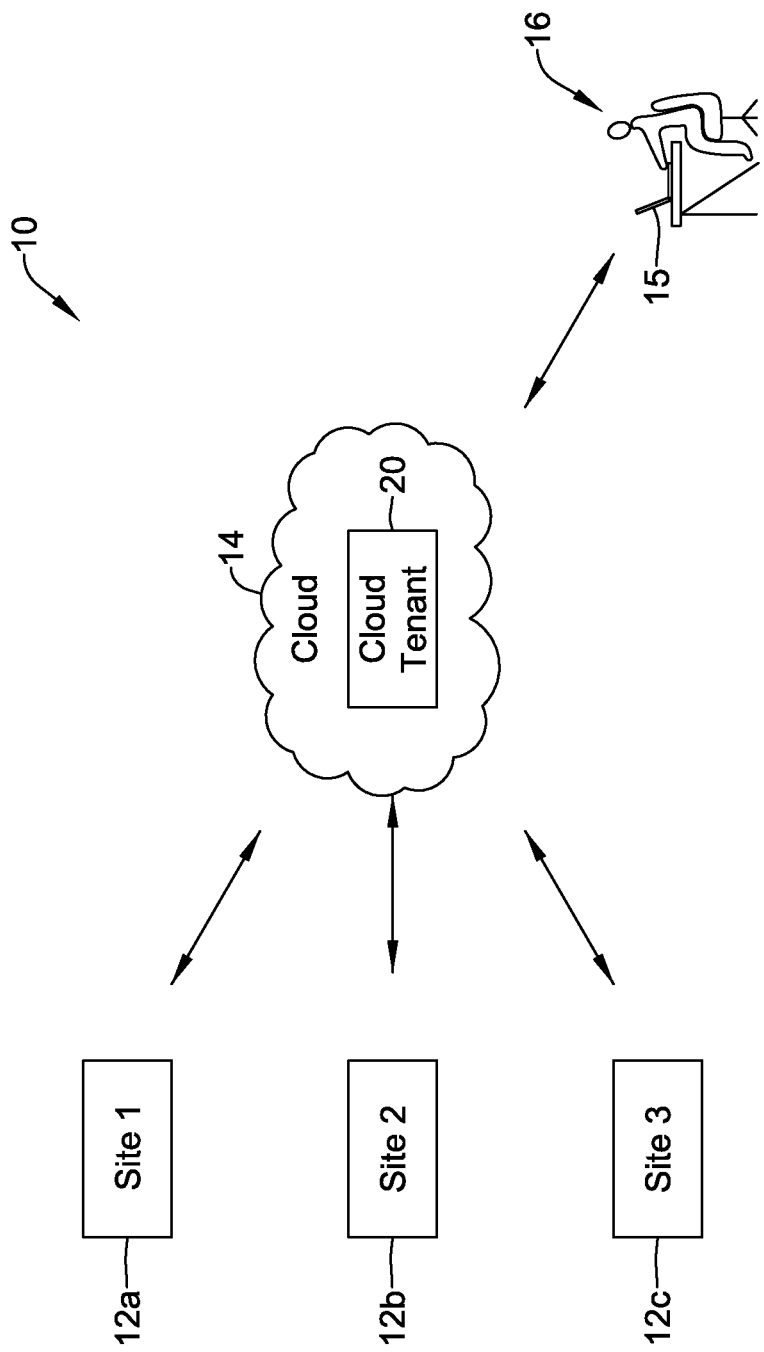
FIG. 1 is a schematic view of an illustrative video management system having an illustrative cloud tenant within a cloud in communication with one or more remotely located sites.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

The present disclosure relates generally to video management systems used in connection with surveillance systems. Video management systems can include, for example, a network connected device, network equipment, a remote monitoring station, a surveillance system deployed in a secure area, a closed circuit television (CCTV), security cameras, networked video recorders, and/or panel controllers. In some cases, video management systems may be used to monitor large areas such as, for example, banks, stadiums, shopping centers, parking lots, airports, and the like, and may be capable of producing 10,000 or more video clips per day. These are just examples. While video surveillance systems are used as an example, it is contemplated that the present disclosure may be used in conjunction with any suitable video based system.

FIG. 1 is a schematic view of an illustrative video management system (VMS) 10 having an illustrative cloud tenant 20 within the cloud 14, in communication with one or more remotely located sites 12a, 12b, and 12c (hereinafter generally referenced as sites 12). The sites 12 may be geographically dispersed and/or may be located within one building or area to be monitored. While a total of three sites 12 are shown, it will appreciated that this is merely illustrative, as there may be any number of remotely located sites 12. As shown in FIG. 1, a security analyst 16 may monitor the sites 12 from a workstation 15 which may be remotely located from the sites 12. However, in some cases, the security analyst 16 may be located at one of the sites 12.

Figure 2:
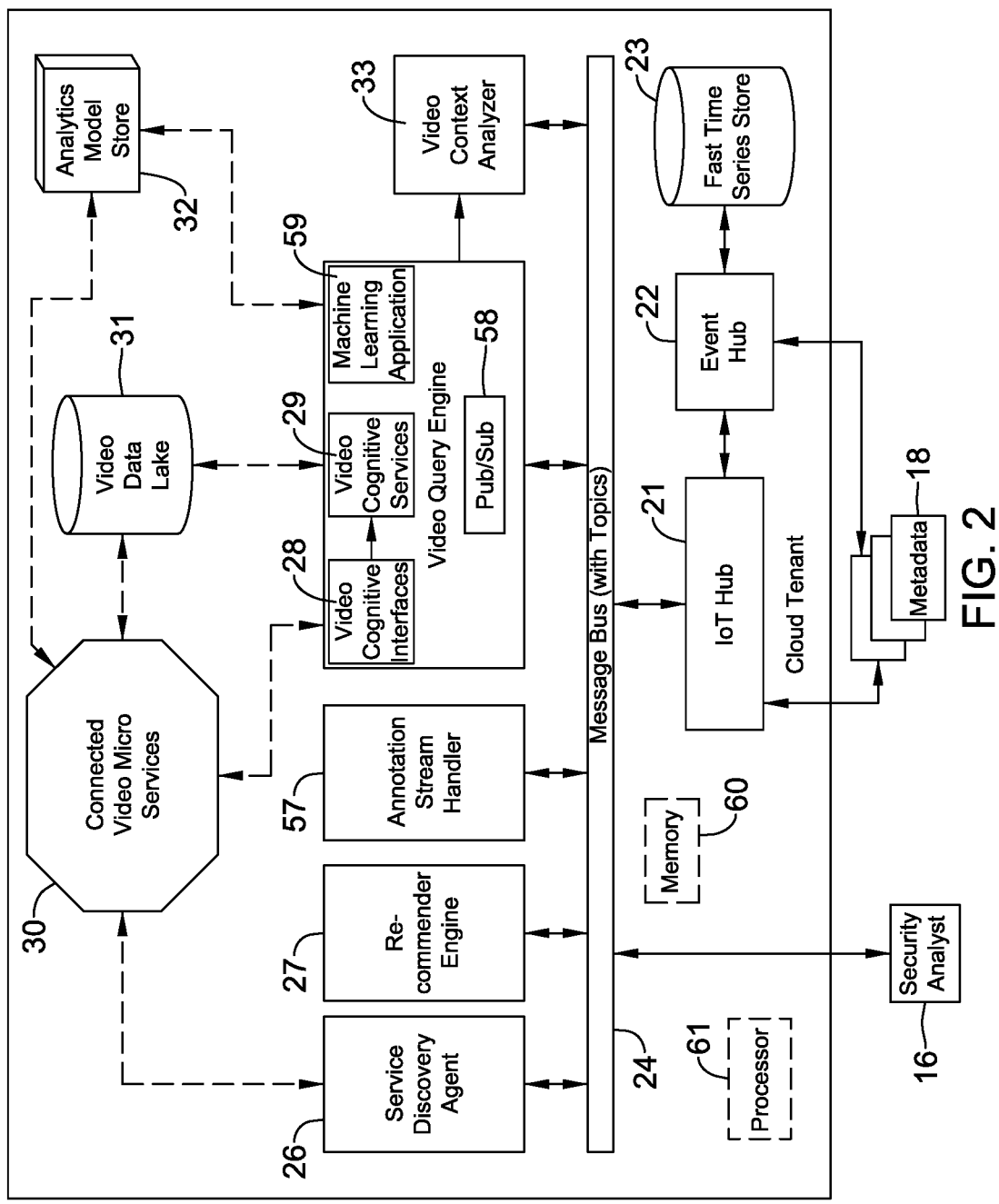
FIG. 2 is a schematic block diagram of the illustrative cloud tenant of FIG. 1.

The workstation 15 may be configured to communicate with the cloud tenant 20, which may include one or more video processing controllers and a memory (e.g., memory 60 as shown in FIG. 2). The cloud tenant 20 may act as a central hub, and may be configured to control one or more components of the video management system 10. The workstation 15 may communicate with the cloud tenant 20 via a wired or wireless link (not shown).

Additionally, the cloud tenant 20 may communicate over one or more wired or wireless networks that may accommodate remote access and/or control of the cloud tenant 20 via another device such as a smart phone, tablet, e-reader, laptop computer, personal computer, or the like. In some cases, the network may be a wireless local area network (LAN). In some cases, the network may be a wide area network or global network (WAN) including, for example, the Internet. In some cases, the wireless local area network may provide a wireless access point and/or a network host device that is separate from the video processing controller. In other cases, the wireless local area network may provide a wireless access point and/or a network host device that is part of the cloud tenant 20. In some cases, the wireless local area network may include a local domain name server (DNS), but this is not required for all embodiments. In some cases, the wireless local area network may be an ad-hoc wireless network, but this is not required.

In some cases, the cloud tenant 20 may be programmed to communicate over the network with an external web service hosted by one or more external web server(s). The cloud tenant 20 may be configured to upload selected data via the network to the external web service where it may be collected and stored on the external web server. In some cases, the data may be indicative of the performance of the video management system 10.

Additionally, the cloud tenant 20 may be configured to receive and/or download selected data, settings and/or services sometimes including software updates from the external web service over the network. The data, settings and/or services may be received automatically from the web service, downloaded periodically in accordance with a control algorithm, and/or downloaded in response to a user request.

Depending upon the application and/or where the video management system user is located, remote access and/or control of the cloud tenant 20 may be provided over a first network and/or a second network. A variety of remote wireless devices may be used to access and/or control the cloud tenant 20 from a remote location (e.g., remote from the cloud tenant 20) over the first network and/or the second network including, but not limited to, mobile phones including smart phones, tablet computers, laptop or personal computers, wireless network-enabled key fobs, e-readers, and/or the like. In many cases, the remote wireless devices are configured to communicate wirelessly over the first network and/or second network with the cloud tenant 20 via one or more wireless communication protocols including, but not limited to, cellular communication, ZigBee, RED-LINK™, Bluetooth, WiFi, IrDA, dedicated short range communication (DSRC), EnOcean, and/or any other suitable common or proprietary wireless protocol, as desired.

The cloud tenant 20 may be in communication with the sites 12 via a wired and/or wireless link (not shown). The remotely located sites 12 may each include a plurality of video surveillance cameras, which may be located along a periphery or scattered throughout an area that is being monitored by the cameras. The cameras may include closed circuit television (CCTV) hardware, such as security cameras, networked video recorders, panel controllers, and/or any other suitable camera. The cameras may be controlled via a control panel that may, for example, be part of the cloud tenant 20. In some instances, the control panel (not illustrated) may be distinct form the cloud tenant 20, and may instead be part of, for example, a server that is local to the particular site 12. As shown, the cloud tenant 20 may be remote from the cameras and/or the sites 12. The cloud tenant 20 may operate under the control of one or more programs loaded from a non-transitory computer-readable, such as a memory.

The sites 12 may further include one or more workstations (e.g., workstation 15), which may be used to display images provided by the cameras to security personnel (e.g., security analyst 16), for example, on a display (not shown). The workstation 15 may be a personal computer, for example, or may be a terminal connected to a cloud-based processing system (e.g., cloud tenant 20). In some cases, the cloud tenant 20 may receive one or more images from the sites 12 and may process the images to enable easer search and discovery of content contained within the images. While discussed with respect to processing live or substantially live video feeds, it will be appreciated that stored images such as playing back video feeds, or even video clips, may be similarly processed. The cloud tenant 20 may also receive commands or other instructions from a remote location such as, for example, workstation 15, via an input/output (I/O). The cloud tenant 20 may be configured to output processed images to portable devices via the cloud 14, and/or to the workstation 15 via the I/O.

In some cases, the cloud tenant 20 may include metadata message brokers which may listen for messages from sites 12. The message brokers may send the metadata to storage centers within the cloud tenant 20. A video query may be generated by the security analyst 16, and one or more components (e.g., one or more processors) within the cloud tenant 20 may apply the video query to the metadata and produce an output. For example, the sites 12 may receive video streams from the plurality of video surveillance cameras, and may generate time-stamped metadata for each video stream captured at each respective site (e.g., sites 12). The time-stamped metadata may then be stored in a memory at each respective site (e.g., sites 12). In some cases, the time-stamped metadata may be sent to a central hub (e.g., the cloud tenant 20) and the metadata may be stored within the cloud tenant 20. In some cases, the video content is not sent to the cloud tenant, at least initially, but rather only the metadata is sent. This reduced the bandwidth required to support the system.

In some cases, the one or more components (e.g., one or more processors) of the control hub (e.g. the cloud tenant 20)

may process metadata stored within the cloud tenant 20 to identify additional objects and/or events occurring in the plurality of video streams captures at the plurality of sites 12. A user (e.g., the security analyst 16) may then enter a query, and the query may be applied to the metadata stored within the cloud tenant 20. The cloud tenant 20 may then return a search result to the user which identifies one or more matching objects and/or events within the stored video streams that match that entered query.

In some cases, the entered query may be entered into a video query engine (e.g., video query engine 25). The video query engine may apply the query to the stored time-stamped metadata and search for events that matches the query. The video query engine may return a search result to the user, and in some cases, the user may provide feedback to indicate whether the search result accurately represent what the user intended when entering the query. For example, the user feedback may include a subsequent user query that is entered after the video query engine returns the search result. The video query engine may include one or more cognitive models (e.g., video cognitive interfaces 28 and video cognitive services 29), which may be refined using machine learning over time based on the user feedback.

As discussed, the sites 12 may receive video streams from the plurality of video surveillance cameras, and may generate time-stamped metadata for each video stream captured at each respective site (e.g., sites 12). The generated time-stamped metadata for each video stream may identify one or more objects and/or events occurring in the corresponding video steam as well as an identifier that uniquely identifies the corresponding video stream. The sites 12 may include one or more processors operatively coupled to memory. The time-stamped metadata may be stored in the memory at each respective site (e.g., sites 12). Subsequently, the time-stamped metadata may be sent to a central hub, such as for example, the cloud tenant 20, which may be remote from the sites 12. In some cases, a site 12 may receive a request from the central hub (e.g., the cloud tenant 20) identifying a particular one of the one or more video streams and a reference time. In response, the remote site 12 may send a video clip that matches the request from the central hub. The request may include an identifier that uniquely identifies the corresponding video stream source and a requested reference time.

FIG. 2 is a schematic block diagram of the illustrative cloud tenant 20. In some cases, as discussed with reference to FIG. 1, the cloud tenant 20 may receive metadata 18, which may include time-stamped metadata, from each of the plurality of remote sites 12. The cloud tenant 20 may include a memory 60 and one or more processors 61. The memory 60 may temporarily store the time-stamped metadata 18 received from each of the plurality of sites 12. The memory 60 may be any suitable type of storage device including, but not limited to, RAM, ROM, EPROM, flash memory, a hard drive, and/or the like. The one or more processors 61 may be operatively coupled to the memory 60, and may be configured to receive time-stamped metadata 18 from the plurality of remote sites 12. The one or more processors 61 may include a plurality of processors or services within the cloud tenant 20 (e.g., IoT applications such as, for example, IoT hub, event hub, video query engine, service discovery agent, etc.). The time-stamped metadata 18 received from each of the plurality of remote sites 12 may identify one or more objects and/or events occurring in the corresponding video stream, as well as an identifier that uniquely identifies the corresponding video stream, as will be discussed further with reference to FIGS. 7A-7C and 12.

As discussed, the metadata 18 may identify one or more objects and/or events occurring in the corresponding video stream. The metadata 18 may be sent from the sites 12 to an IoT hub 21 and/or to an event hub 22. The IoT hub 21 may collect a large volume of metadata 18 from the plurality of sites 12, and may act as a central message hub for bi-directional communication between applications and the devices it manages, as well as communication both from the sites 12 to the cloud tenant 20 and the cloud tenant 20 to the sites 12. The IoT hub 21 may support multiple messaging modes such as site to cloud tenant 20, metadata 18 file upload from the sites, and request-reply methods to control the overall video management system 10 from the cloud 14. The IoT hub 21 may further maintain the health of the cloud tenant 20 by tracking events such as site creation, site failures, and site connections.

In some cases, the event hub 22 may be configured to receive and process millions of video events per second (e.g., metadata 18). The metadata 18 sent to the event hub 22 may be transformed and stored using real-time analytics and/or batching/storage adapters. The event hub 22 may provide a distributed stream processing platform and may identify behaviors within the metadata 18. For example, the identified behaviors may include, event-pattern detection, event abstraction, event filtering, event aggregation and transformation, modeling event hierarchies, detecting event relationships, and abstracting event-driven processes. The event hub 22 may be coupled with the IoT hub 21 such that the metadata 18 processed by the event hub 22 may be sent to a message bus 24 within the cloud tenant 20. Further, the event hub 22 may be coupled to a fast time series store 23, which may be configured to store time-stamped metadata 18 upon receiving the metadata 18 from the event hub 22. The time-stamped metadata 18 may include measurements or events that are tracked, monitored, down sampled, and/or aggregated over time. The fast time series store 23 may be configured to store the metadata 18 using metrics or measurements that are time-stamped such that one or more math models may be applied on top of the metadata 18. In some cases, the fast time series store 23 may measure changes over time.

As discussed, the IoT hub 21 may communicate with the message bus 24. The message bus 24 may include a combination of a data model, a command set, and a messaging infrastructure to allow multiple systems to communicate through a shared set of interfaces. In the cloud tenant 20, the message bus 24 may be configured to operate as a processing engine and a common interface between the various IoT applications, which may operate together using publisher/subscriber (e.g., pub/sub 58) interfaces. This may help the cloud tenant 20 scale horizontally as well as vertically, which may help the cloud tenant 20 meet demand as the number of sites 12 increases. The message bus 24 may further manage data in motion, and may aid with cyber security and fraud management of the cloud tenant 20. In some cases, the security analyst 16 may enter a search query into the video management system 10. The query may be received by the message bus 24 within the cloud tenant 20, and subsequently sent to a video query engine 25.

The video query engine 25 may be a core component of the cloud tenant 20. The video query engine 25 may communicate with a video data lake 31, an analytics model store 32, and may be driven by a connected video micro services 30. The video data lake may be part of the memory 60, or may be separate. In some instances, the video query engine

25 may include a publisher/subscriber, e.g., pub/sub 58, which may be configured to communicate with various applications that may subscribe to the metadata 18 within the cloud tenant 20. The pub/sub 58 may be connected to the message bus 24 to maintain independence and load balancing capabilities. The video query engine 25 may further include one or more video cognitive interfaces 28, one or more video cognitive services 29, and one or more machine learning applications 59. The video query engine 25 may be a high fidelity video query engine that may be configured to create a summary of the video data streams, which may be generated by applying a search query to the metadata 18. The summary may include one or more results which match the search query, and further may associate each one of the one or more results with the corresponding site 12 from which the video data stream is from. The one or more video cognitive services 29 may be configured to provide various inferences about the search query entered. The inferences may include, for example, a user's intent for the query, a user's emotion, a type of user, a type of situation, a resolution, and a situational or other context for the query.

As stated, the video query engine 25 may be driven by the connected video micro-services 30. The video micro-services 30 may be the core service orchestration layer within the cloud tenant 20, in which a plurality of video IoT micro-services 30 may be deployed, monitored, and/or maintained. The micro-services 30 may be managed by an application programming interface gateway (e.g., an API gateway), and an application level layer 7 load balancer. The micro-services 30 may be stateless and may hold the implementation of various video application capabilities ranging from analysis to discovery of metadata 18, and other similar video related mathematical and/or other operations. In some cases, these video micro-services 30 may have their own local storage or cache which allow for rapid computation and processing. Each micro-service of the plurality of micro-services 30 may include a defined interface as well as an articulated atomic purpose to solve a client applications need. The connected video micro-services 30 may be able to scale horizontally and vertically based upon the evolution of the cloud tenant 20 as well as the number of sites 12 the cloud tenant 20 supports.

In some cases, the video query engine 25 may produce context objects, which may include one or more objects within the metadata 18 that may not be able to be identified. The video query engine 25 may be in communication with a video context analyzer 33, and the video context analyzer 33 may receive the unidentified context objects and perform further analysis on the metadata 18. The video context analyzer 33 may be in communication with the message bus 24 and thus may have access to the metadata 18 received from the IoT hub 21. In some cases, the video context analyzer 33 may include a module that may be used to identify the previously unidentified context objects, and map the context objects received from the video query engine 25 to the original metadata 18 video data schema, such as, for example, video clips, clip segments, and/or storage units.

In some cases, the cloud tenant 20 may include a service discovery agent 26, a recommender engine 27, and an annotation stream handler 57. The service discovery agent 26, the recommender engine 27, and the annotation stream handler 57 may all be in communication with the message bus 24. The service discovery agent 26 may be configured to discover and bind one or more services in the runtime based upon the dynamic need. For example, when the security analyst 16 submits a query from one of the sites 12, the particular application the security analyst 16 and/or the site 12 utilizes may determine which type of code video micro services may be needed to satisfy the query. In such cases, the service discovery agent 26 may act as a broker between the connected video micro-services 30 and the application used by the security analyst 16 and/or the sites 12 to discover, define, negotiate, and bind the connected video micro-services 30 to the application dynamically. The service discovery agent 26 may include a common language that allows the applications used by the security analyst 16 and/or the sites 12, and the components within the cloud tenant 20 to communicate with one another without the need for user intervention or explicit configuration. The service discovery agent 26 may maintain its own metadata which may be used for rapid identification and mapping.

The recommender engine 27 may be a subclass of information filtering system that seeks to predict the rating or preference a user (e.g., the security analyst 16) of the applications may assign to an individual item. The recommender engine 27 may be used to analyze and recommend the appropriate analytical or machine learning model that may be required for the various applications based upon the search query submitted.

The annotation stream handler 57 may extract various types of information about the video streams received from the message bus 24, and add the information to the metadata of the video stream. In some examples, the annotation stream handler 57 may extract metadata, and in other cases, the annotation stream handler 57 may extract information from the metadata 18 itself. The annotations provided by the annotation stream handler 57 may enable the applications used by the security analyst 16 and/or the sites 12 to browse, search, analyze, compare, retrieve, and categorize the video streams and/or the metadata 18 more easily. The applications may be able to utilize the annotations provided by the annotation stream handler 57 without disrupting the real time even processing data traffic.

As discussed, the service discovery agent 26 and the video query engine 25 may be in communication with the connected video micro-services 30. The connected video micro-services 30 and the video query engine 25 may further be in communication with a video data lake 31. The video data lake 31 may be a centralized repository that allows for the storage of structured and unstructured metadata 18 at any scale for later post processing. Thus, the metadata 18 may be able to be stored prior to having to structure, process, and/or run various analytics over the metadata 18. The video data lake 31 may be able to scale horizontally and vertically based upon the dynamic demand as well as the number of sites 12 connected to the cloud tenant 20.

The cloud tenant 20 may include an analytics model store 32, which may be in communication with the connected video micro-services 30 and the video query engine 25. The analytics model store 32 may be a centralized storage repository for storing a plurality of analytical and/or machine learning models related to the video cognitive services 29, which enable the video query engine 25 to understand natural language. The models present in the analytics model store 32 may be continuously trained, tuned, and evolved based upon the availability of new datasets from each of the plurality of sites 12. The video applications used by the sites 12 may link to the analytical and/or the machine learning models present in the analytics model store 32 to maintain the consistency of the inference and accuracy levels. Models present in the analytics model store 32 may be shared across multiple applications at the same time.

Figure 3:
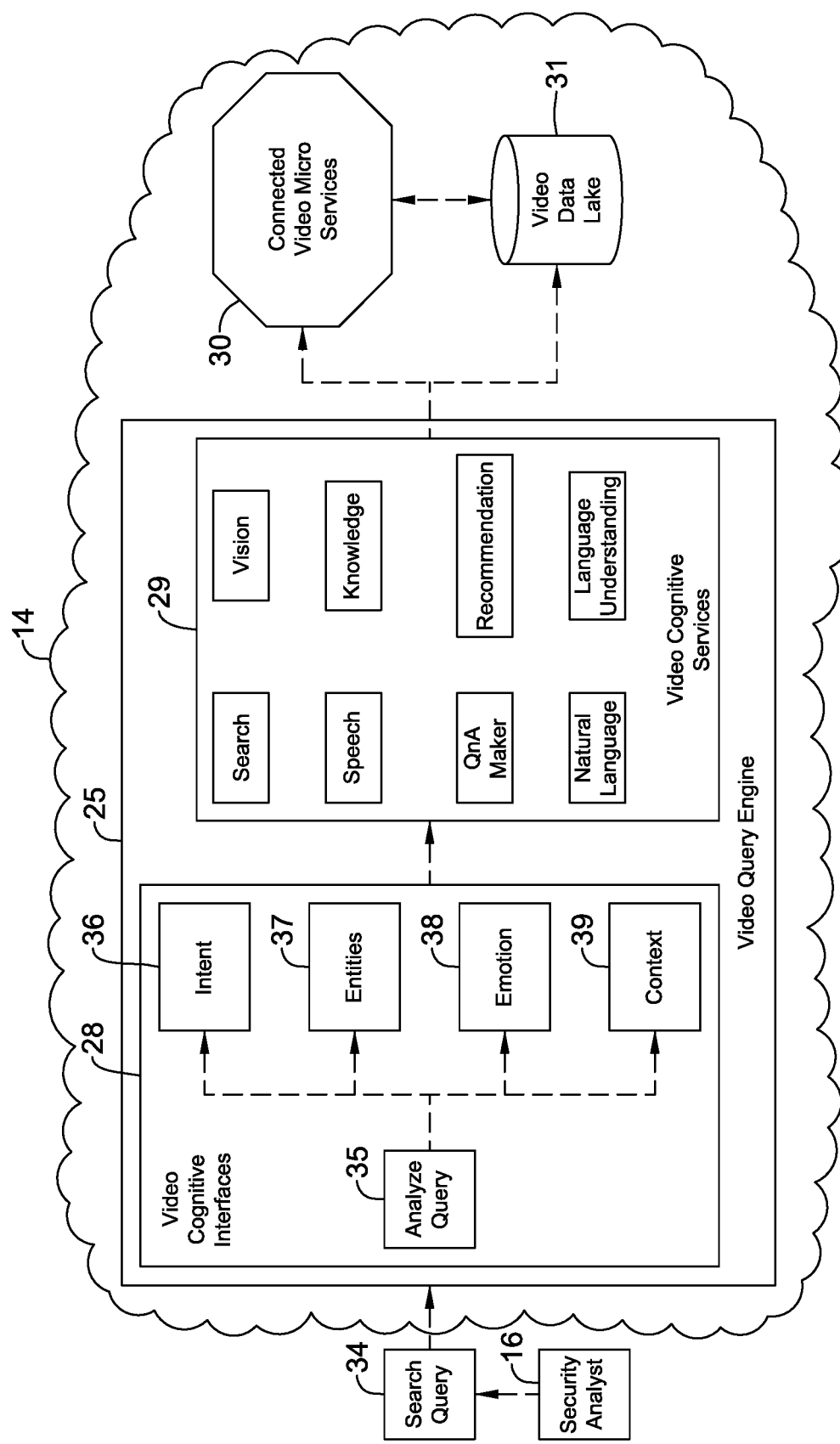
FIG. 3 is a schematic view of an illustrative video query engine of the illustrative cloud tenant of FIG. 2 in communication with a security analyst.

FIG. 3 is a schematic view of the illustrative video query engine 25 of the illustrative cloud tenant 20 in communication with the security analyst 16. As discussed with reference to FIG. 2, the video query engine 25 may receive a search query 34 from a user (e.g., the security analyst 16). For example, a user may input a search query 34 into a user interface (not shown) which may be provided by a number of portable devices, such as for example, but not limited to, remote internet devices, including a smart phone, a tablet computer, a laptop computer, a desktop computer, or a workstation. The search query 34 may be entered using natural human language (e.g., find a man wearing a red shirt, carrying a briefcase). The video query engine 25 may include one or more video cognitive interfaces 28. Within the video cognitive interfaces 28, the video query engine 25 may analyze the query, at block 35, and convert the natural human language into a computer search language. The computer search query 34 may be applied to the time-stamped metadata 18 stored within the memory 60 of the cloud tenant 20, and the video query engine 25 may mine the metadata 18 and return a result to the user (e.g., security analyst 16). In some cases, the search query 34 may be applied over a Spatial Temporal Regional Graph (STRG), as discussed further with reference to FIG. 4. The video query engine 25 may mine the metadata 18 using the video cognitive services 29. In some cases, the video cognitive services 29 may utilize the machine learning application 59 to be able to better understand the user's intent for the search based on the user's context. For example, analyzing the query, at block 35, may include the video cognitive interfaces 28 defining an inference for the search query 34, such as for example, a user's intent 36, one or more entities 37, a user's emotion 38, and/or a context 39 of the search query 34. The user's intent 36 may represent a task or action the security analyst 16 (e.g., the user) intents to perform. The one or more entities 37 may represent a word or phrase within the search query 34 to be extracted, such as a primary object (e.g., a water bottle, an airport, etc.) and/or event of interest to the user. The user's emotion 38 may include an attempt to extract the tone of the search query to better understand the user's intent 36, and the context 39 may represent the context of the search query within a broader conversation (e.g. differences between prior search queries) that has been invoked, sometimes along with some level the situational awareness (e.g., situational context).

The video cognitive services 29 may apply the search query 34 to the metadata 18, utilize the machine learning application 59 (as shown in FIG. 2) to better define the user's intent 36, etc., and may search for one or more objects and/or events in the plurality of video streams and/or metadata 18 that match the search query 34. The video cognitive services 29 may subsequently use API-mashups to interact with the connected video micro services 30 and the video data lake 31 to return the result to the search query 34. The video cognitive services 29 may provide feedback to the user (e.g., security analyst 16) to further refine the search query 34. The user (e.g., security analyst 16) may interact with the video cognitive services 29 via the user interface to provide user feedback, wherein the feedback may include, for example, a subsequent search query that is entered after the video query engine 25 returns the initial search result to the user (e.g., security analyst 16). The feedback provided by the user may be used by the video cognitive services 29 within the video query engine 25 to better refine the user search query 34 and return a result that more accurately matches the user intent of the search query 34.

The result returned to the user may identify one or more matching objects and/or events within the plurality of video data streams and/or the metadata 18 that match the search query 34. For each matching object and/or event that matches the search query 34, the video query engine 25 may provide a link, such as for example, a hyperlink or a reference, corresponding to the video stream that includes the matching object and/or event. The link provided may correspond to one of the plurality of remote sites 12 within the video management system 10. The user (e.g., security analyst 16) may use the link to download a video clip of the video data stream that includes the matching object and/or event from the corresponding remote site 12. The video clip may then be outputted to the user via the user interface for display. The user may then view the matching clip and determine if the search result matches the search query 34. The user may provide feedback to the video query engine 25 within the cloud tenant 20 indicating whether or not the search result matches the search query 34.

The video query engine 25 may utilize the video cognitive services 29 to learn over time such that the video query engine 25 may recognize video objects such as human dimensions (e.g., height, gender, race, weight, etc.), human wearables (e.g., shoes, hat, dress, etc.), objects carried by a human (e.g., bag and type of bag, an umbrella, a book, a weapon, etc.), a vehicle (e.g., a car, a van, a bus, a bicycle, the color of the vehicle, etc.), and real world dimensions (e.g., distance, height, length, etc.). By using the feedback provided by the user, the video cognitive services 29 along with the machine learning application 59, may continually update its stored database, stored within the memory 60 of the cloud tenant 20, thereby providing more accurate search results over time to the received search queries 34.

Figure 4:
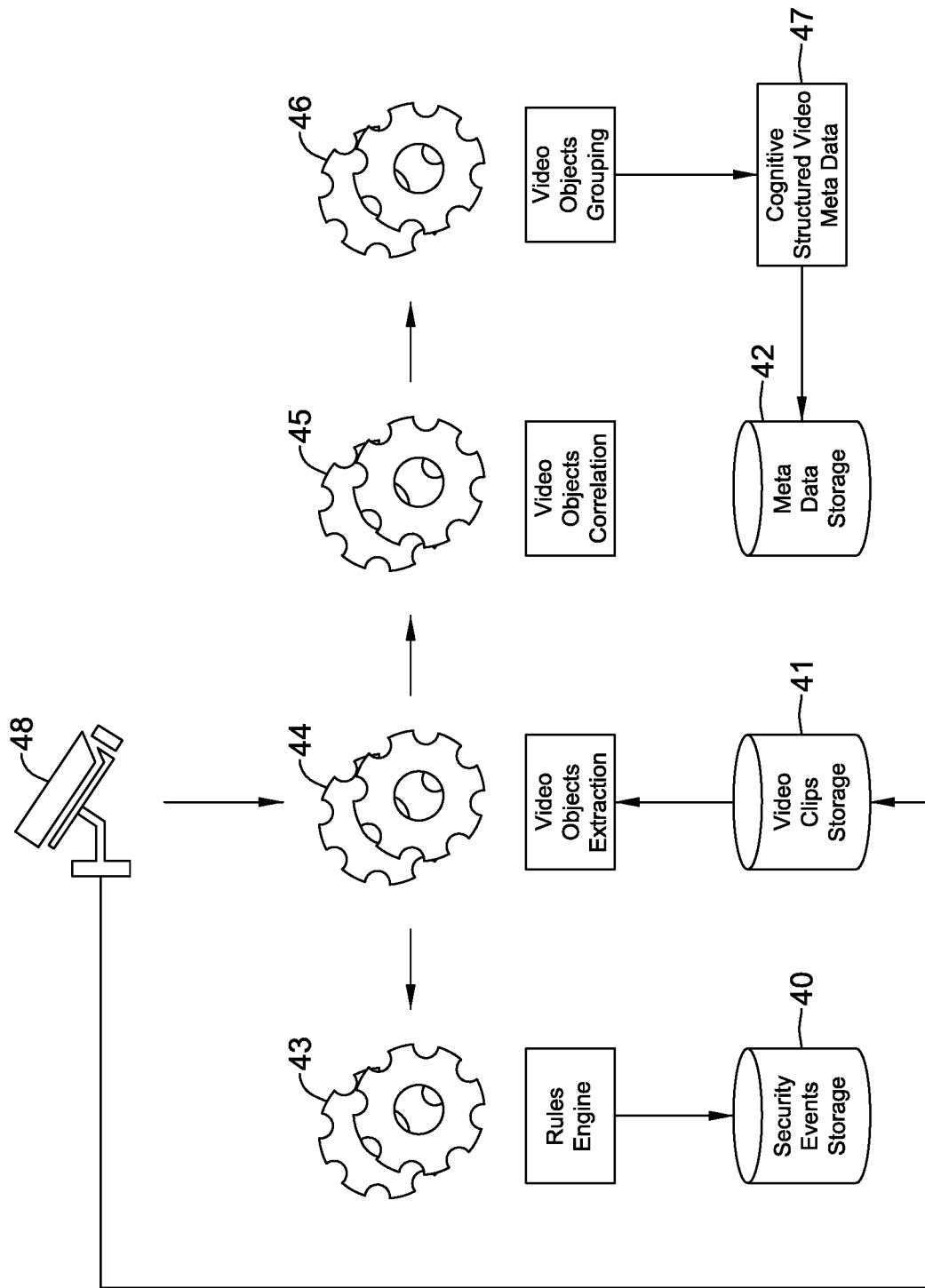
FIG. 4 is a schematic block diagram showing an illustrative Spatial Temporal Regional Graph (STRG) method illustrating receiving and storing metadata from one or more remotely located sites.

FIG. 4 is a schematic block diagram showing an illustrative Spatial Temporal Regional Graph (STRG) method showing receiving and storing metadata from one or more remotely located sites (e.g., sites 12). As shown in FIG. 4, a video surveillance camera 48, which may be representative of the surveillance cameras located at the plurality of remote sites 12, may capture one or more video data streams at its respective site. The camera 48 may be coupled to a memory which may include for example, a security events storage 40, a video clips storage 41 and a metadata storage 42. The camera 48 may further be coupled to one or more processors which may be operatively coupled to the memory. The camera 48 may capture one or more video data streams, and may send the one or more video data streams to the one or more processors. In some cases, the one or more processors may be a part of the camera 48. In some cases, the one or more processors may be remote from the camera 48 and the site 12. In some cases, the one or more processors may communicate with or control one or more components (e.g., the camera 48) of the video management system 10 via a wired or wireless link (not shown). The one or more processors may include one or more applications which may be configured to process the one or more video data streams so as to extract information, and group the one or more video data streams. For example, the one or more processors may receive the one or more video data streams and extract object information, at block 44. The extracted information may include, for example, feature values from unstructured data such as colors, shapes, human gender, objects carried by humans, vehicles, human wearables, and the like. The extracted features may then be correlated with other objects, at block 45, such as persons connected with the respective object, time and place of the event and/or video data stream, a person's behavior and/or a routine over time, any material exchanges between correlated persons or objects, etc. The extracted and correlated objects (e.g., people, objects, vehicles, etc.) may then be grouped and/or indexed accordingly, at block 46. For example, the objects may be indexed by incorporating various levels of the video objects, such as for example, blocks, regions, moving objects, scene levels, etc., for faster retrieval of information. Once grouped, the video objects may be converted to video metadata, at block 47. The metadata may then be stored in a metadata storage 42 (e.g., a memory). The metadata storage 42 may include metadata stored as structural RAG, STRG, OG, and/or BG representation for later searching purposes. The metadata may further be stored in a timeline (e.g. timestamped).

In some cases, as discussed, the camera 48 may be coupled to a memory which may include for example, the video clips storage 41. The video data streams captured by the camera 48 may be stored in the video clips storage 41 at the site 12. In some cases, the stored video data streams may be subjected to video object extraction, at block 44. Upon the video object extraction, the video data streams may then be correlated with other objects, at block 45, grouped, at block 46, converted to metadata, at block 47, and ultimately stored in the metadata storage 42. In some cases, the video data streams received from the camera 48 may enter a rules engine 43. The rules engine 43 may include an additional layer in which the video data streams may be indexed by type of event. For example, a suspicious person carrying a weapon, or person loitering, or two or more people in an altercation, etc. may be indexed and stored within the security events storage 40, which may allow a security personally quicker access to the particular event.

Figure 5:
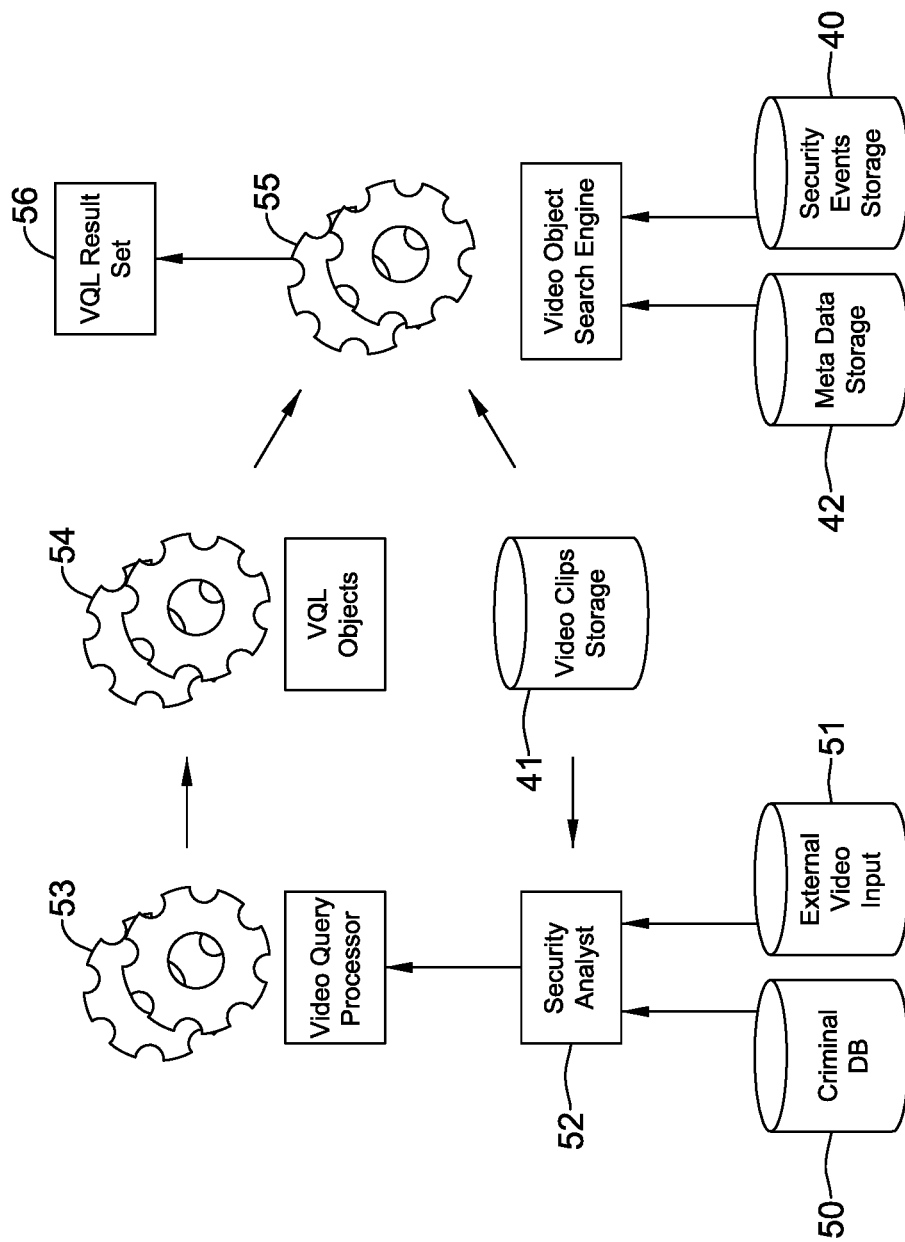
FIG. 5 is a schematic block diagram showing an illustrative method for returning a search result based on a video query of the stored metadata.

FIG. 5 is a schematic block diagram showing an illustrative method for returning a search result based on a video query of the stored metadata, received from the one or more sites. As shown in FIG. 5, a security analyst 52 may enter a search query at a workstation. The security analyst 52 may have access to a criminal database 50 and additional external video input 51, as well as the video clips storage 41. The security analyst 52 may enter the search query into the video management system, and a video query processor 53 may apply the search query to the video data from the criminal database 50, the external video input 51 and the video clips storage 41. The video query processor 53 may extract the relevant video data streams, at block 54, and may send the relevant video data streams to a video object search engine 55. The video object search engine 55 may be an example of the video query engine 25. The video object search engine 55 may have access to the video clips storage 41, the metadata storage 42 and the security events storage 40. In some cases, the video object search engine 55 may be within the cloud tenant 20. In some cases, the video object search engine 55 may be located within the one or more processors at each respective site 12. The video object search engine 55 may apply the search query to the video data streams and the metadata received from the video clips storage 41, the metadata storage 42, the security events storage 40, and relevant data streams received from block 54, and may output a video query result list, at block 56.

In some cases, the video object search engine 55 may utilize unsupervised learning algorithms, such as clustering and conceptual clustering to find the complex relationships and meaningful information in video objects for efficient access to the relationships of video objects across the multiple video data sources and/or streams (e.g., the metadata received from the video clips storage 41, the metadata storage 42, the security events storage 40, and relevant data streams received from block 54). The video object search engine 55 may generate time-stamped metadata which may be presented in the video query result list, at block 56. In some cases, the video query result list may include one or more links (e.g., a reference or a hyperlink) to corresponding video streams that match the search query.

Figure 6:
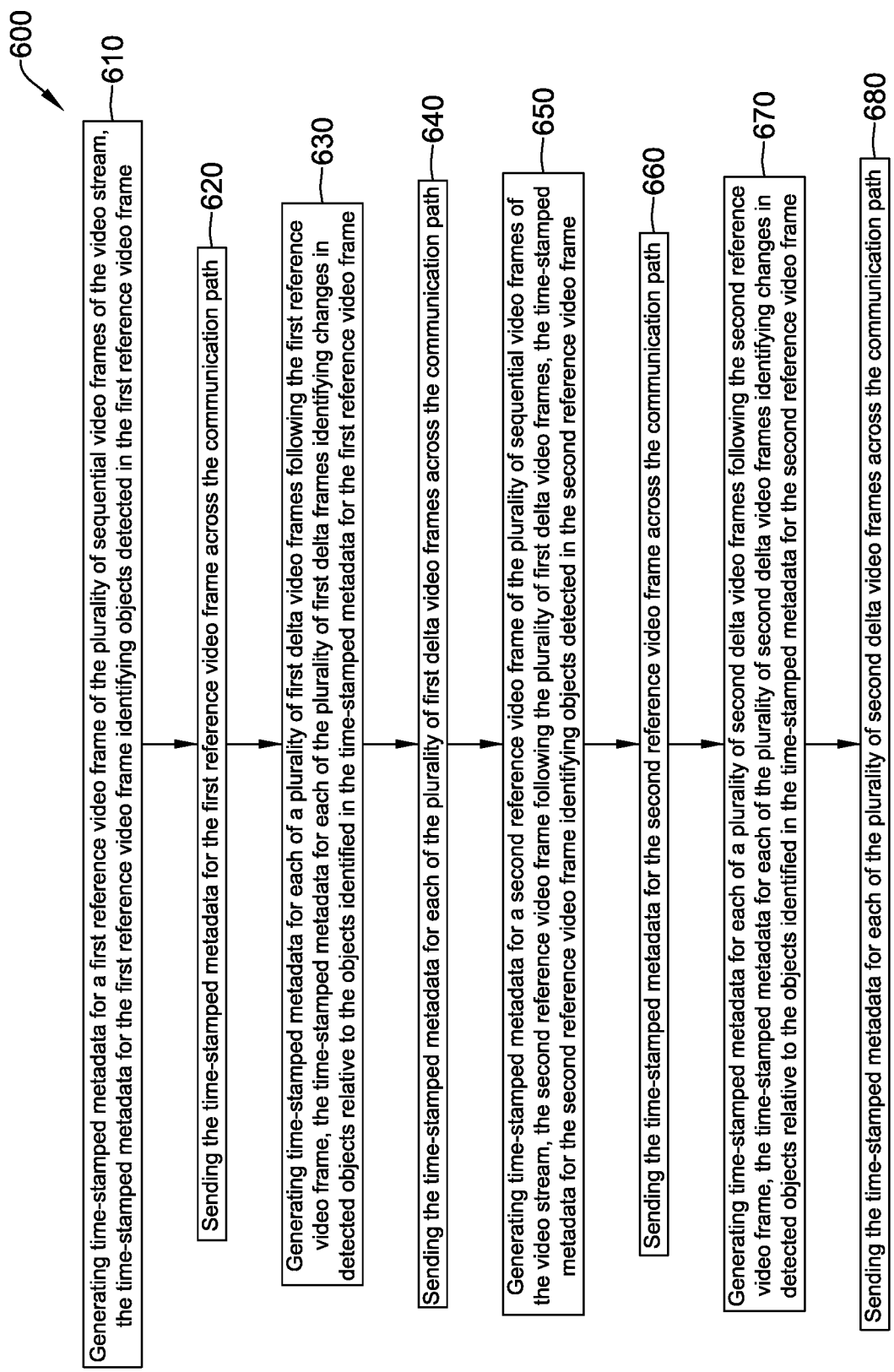
FIG. 6 is a flow diagram showing an illustrative method for sending time-stamped metadata corresponding to a video stream across a communication path having a limited bandwidth.

FIG. 6 is a flow diagram showing an illustrative method 600 for sending time-stamped metadata corresponding to a video stream across a communication path having a limited bandwidth. The illustrative method 600 includes the video management system generating time-stamped metadata for a first reference video frame of the plurality of sequential video frames of the video stream, the time-stamped metadata for the first reference video frame identifying objects detected in the first reference video frame, as referenced at block 610. The video management system may send the time-stamped metadata for the first reference video frame across the communication path, as referenced at block 620. The video management system may subsequently generate time-stamped metadata for each of a plurality of first delta video frames following the first reference video frame, wherein the time-stamped metadata for each of the plurality of first delta video frames identifies changes in detected objects relative to the objects identified in the time-stamped metadata for the first reference video frame, as referenced at block 630. The time-stamped metadata for each of the first reference video frame and each of the plurality of first delta video frames may identify objects and associations between objects identified in the corresponding video frame. The associations between objects may include, for example, a distance between objects. In some cases, for each object detected, the time-stamped metadata may identify a unique object identifier along with one or more of an object description, an object position, an object size, and the association with one or more other detected objects. The time-stamped metadata for each of the plurality of first delta frames may identify changes in detected objects relative to the object identified in the time-stamped metadata for the first reference video frame, by identifying a change in the object's position, size, association with one or more other detected objects, and/or by identifying a new object that is not present in the first reference video frame. In some cases, the associations between objects may be represented using a Spatial Temporal Regional Graph (STRG) in the time-stamped metadata.

The time-stamped metadata for each of the plurality of first delta video frames may be sent across the communication path, as referenced at block 640. In some cases, the video management system may further generate time-stamped metadata for a second reference video frame of the plurality of sequential video frames of the video stream, wherein the second reference video frame follows the plurality of first delta video frames, and the time-stamped metadata for the second reference video frame identifies objects detected in the second reference video frame, as referenced at block 650. In some cases, the number of the plurality of first delta video frames following the first reference video frame and the number of the plurality of second delta video frames following the second reference video frame may be the same. In some cases, the number of the plurality of first delta video frames following the first reference video frame and the number of the plurality of second delta video frames following the second reference video frame may be different. In some cases, the number of the plurality of first delta video frames following the first reference video frame is dependent on an amount of time-stamped metadata generated for each of the plurality of first delta video frames relative to an expected size of the time-stamped metadata if a new reference video frame were taken. The video management system may then send the time-stamped metadata for the second reference video frame across the communication path, as referenced at block 660. In some cases, when the video management system generates the time-stamped metadata for the second reference frame, the video management may generate time-stamped metadata for each of a plurality of second delta video frames following the second reference video frame, wherein the time-stamped metadata for each of the plurality of second delta video frames identifying changes in detected objects relative to the objects identified in the time-stamped metadata for the second reference video frame, as referenced at block 670, and then the video management system may send the time-stamped metadata for each of the plurality of second delta video frames across the communication path, as referenced at block 680.

Figure 7A:
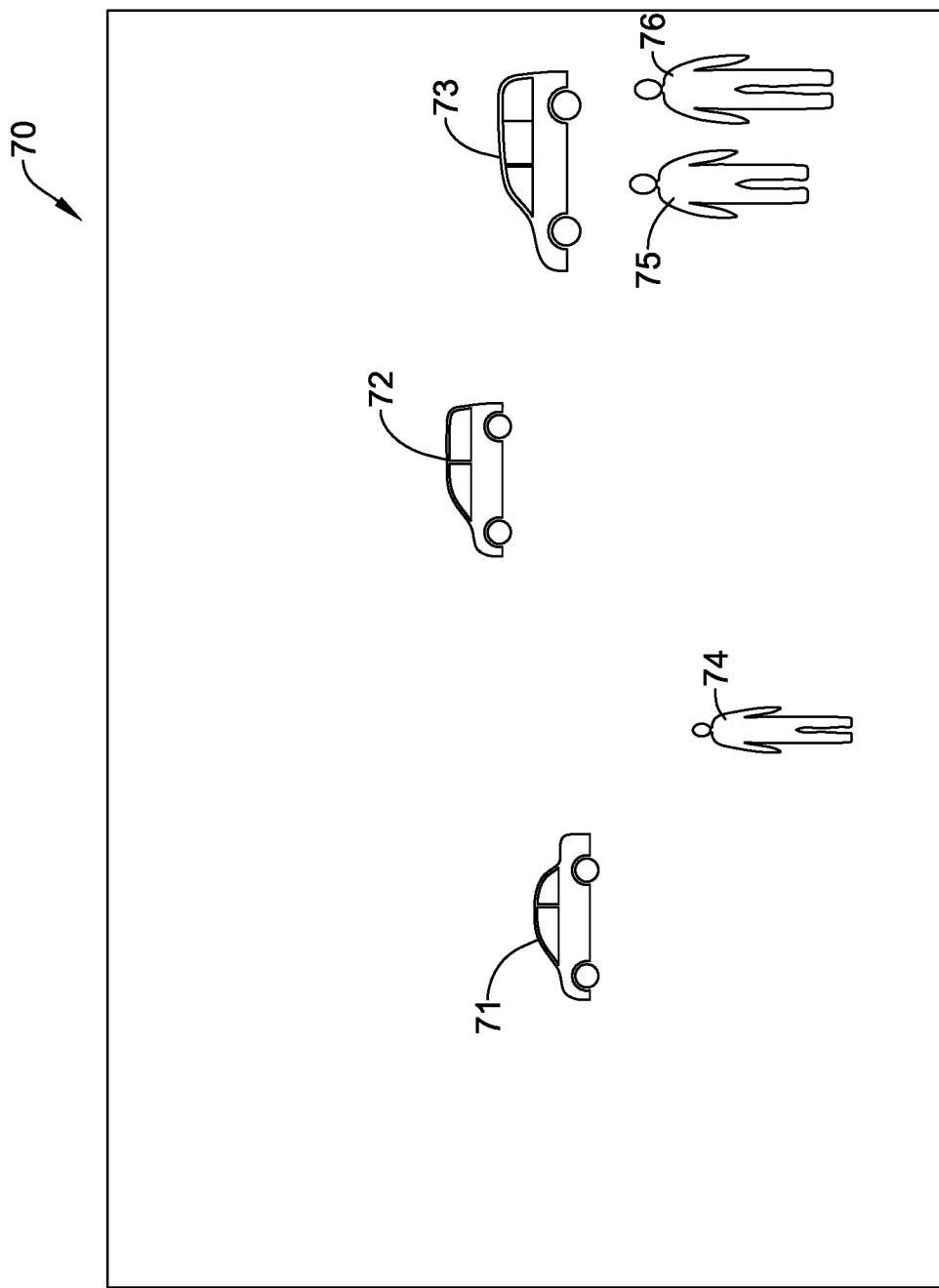
FIG. 7A shows an illustrative scene including one or more objects.
Figure 7B:
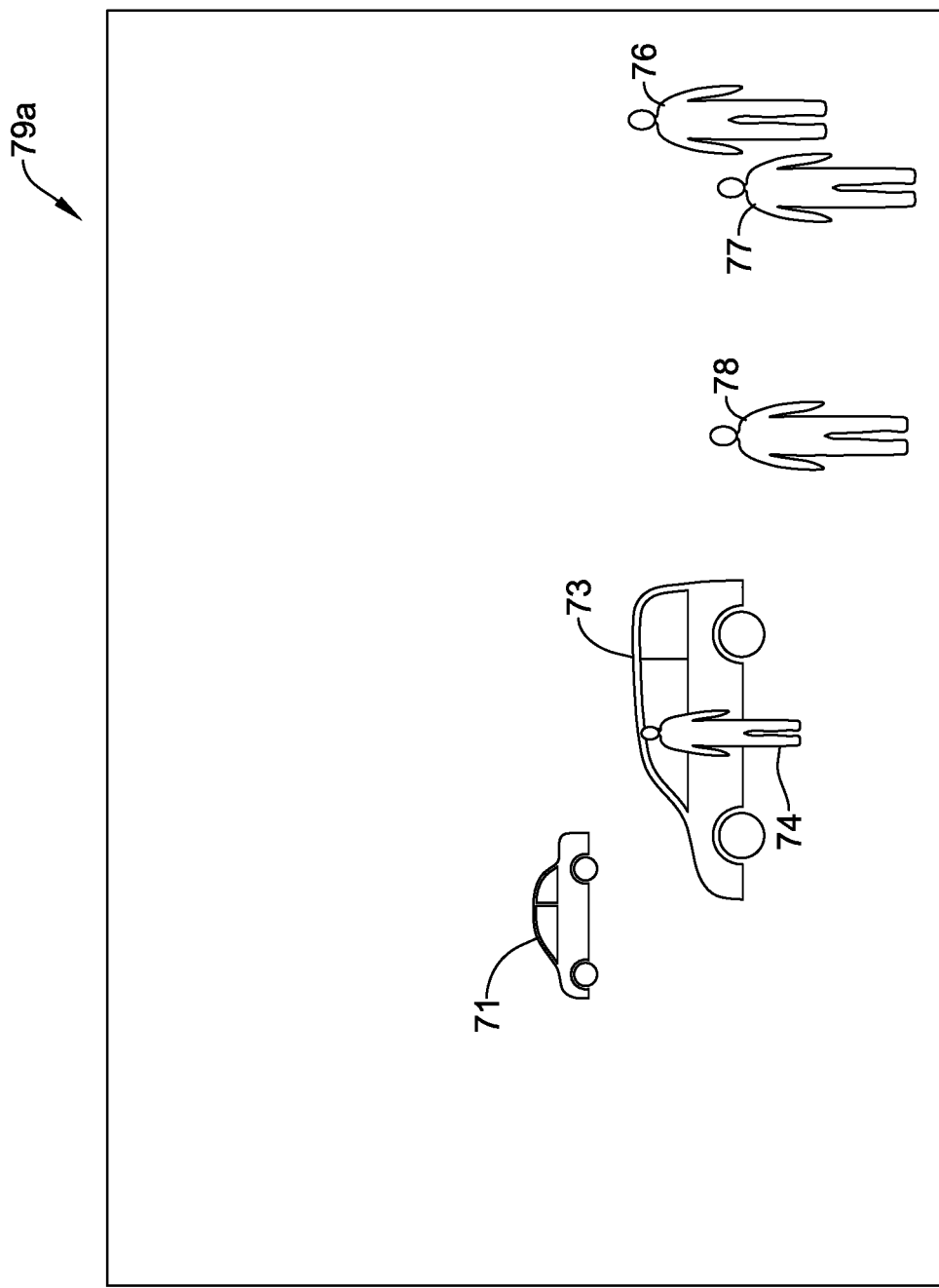
FIG. 7B shows the illustrative scene of FIG. 7A, in which the one or more objects have changed position.
Figure 7C:
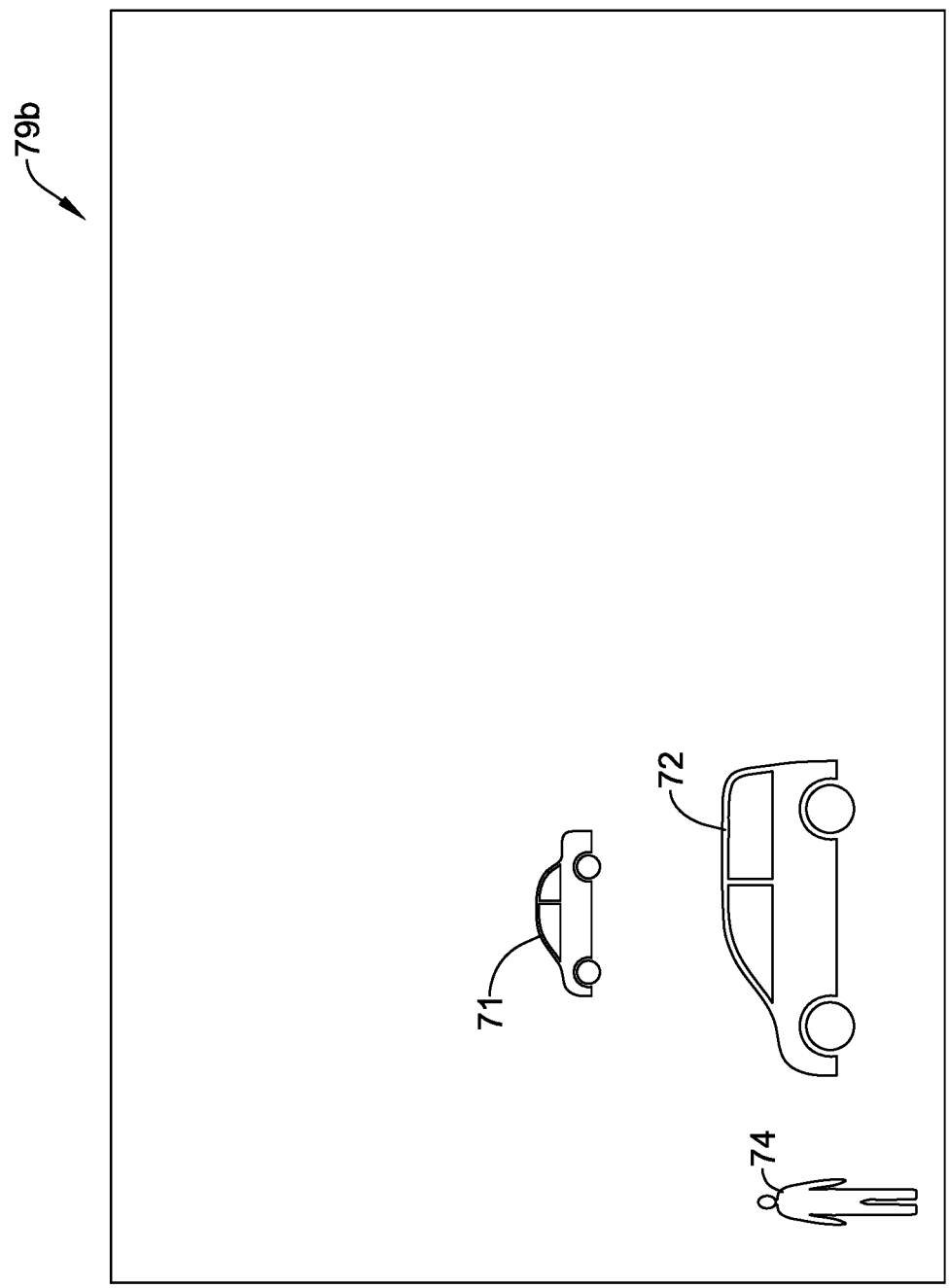
FIG. 7C shows the illustrative scene of FIG. 7A, in which the one or more objects have changed position.

FIGS. 7A-7C illustrate sequential scenes including one or more objects. The scenes in FIGS. 7A-7C may be illustrative of the method 600. For example, the scenes shown in FIGS. 7A-7C may illustrate how the video management system 10 may send time-stamped metadata corresponding to a video stream across a communication path having a limited bandwidth. In some cases, the video management system 10 may generate time-stamped metadata for a first reference frame 70. The time-stamped metadata for the first reference frame 70 may identify objects detected in the first reference frame 70. The video management system 10 may store the time-stamped metadata for the first reference frame 70 in a memory. In one example, the scene shown in FIG. 7A may be considered to be the reference frame 70. The reference frame 70 may be a first reference video frame of a plurality of sequential video frames (e.g., sequential scenes) of the video stream, wherein the first reference frame 70 includes the time-stamped metadata.

In some cases, the video management system may further generate time-stamped metadata for each of a plurality of first delta frames 79a and 79b following the first reference frame 70. The time-stamped metadata for each of the delta frames 79a, 79b may identify changes in the detected objects relative to the objects identified in the time-stamped metadata for the first reference frame 70. FIGS. 7B and 7C depict each of one of the plurality of delta video frames 79a and 79b, following the first reference video frame 70. The time-stamped metadata for each of the delta frames 79a, 79b may be stored in a memory. The time-stamped metadata for the reference frame 70 and each of the delta frames 79a, 79b may be sent to the cloud tenant 20 via a communication path. In some cases, sending the reference frame 70 and each of the delta frames 79a, 79b may reduce the amount of bandwidth required to send the frames, particularly when there are not significant changes from frame to frame. When no changes are detected, no metadata may be sent for the delta frame.

In some cases, the time-stamped metadata for the reference frame 70 and/or the delta frames 79a, 79b may identify a unique object identifier along with one or more of an object description, an object position, and/or an object size. In some cases, the metadata for each of the reference frame 70 and the delta frames 79a, 79b may identify associations between the objects identified in the corresponding video frame, and may identify changed in the detected objects by identifying a change in an object's position and/or size. The associations may include, for example, a distance between the objects. In some cases, the associations may be represented using a Spatial Temporal Regional Graph (STRG).

In some cases, reference frames (e.g., reference frame 70) may contain all the objects in the frame/scene, and the delta frames (e.g., delta frames 79a, 79b) may include only the object information that differs from the reference frame (e.g., reference frame 70). For example, the first reference frame 70 may identify objects detected in the first reference frame 70, such as, for example, a first car 71, a second car 72, a third car 73, a first person 74, a second person 75, and a third person 76. FIG. 7B may identify objects detected in the delta frame 79a in which the objects detected differ from the reference frame 70, such as, for example, the third car 73 has changed position in the frame, the first person 74 has changed position in the frame, the third person 76 has changed position, and a plurality of new people 77, and 78 have entered the frame. FIG. 7C may identify objects detected in the delta frame 79b in which the objects detected differ from the delta frame 79a, such as, for example, the second car 72 has returned and the first person 74 has changed position.

In some cases, the time-stamped metadata for each frame in the plurality of sequential video frames (e.g., reference frame 70, delta frames 79a, and 79b) may include a frame reference that monotonically increase in number. For example, the reference frame 70 may be labeled as RFn, and the subsequent delta frames 79a, 79b may be labeled as DFn (wherein n represents a number). Further, a refresh period within the plurality of sequential frames may be labeled as N. For example, with reference to FIGS. 7A-7C, the sequence of frames would be labeled {RF1, DF1, DF2}, as the delta frames 79a, 79b differ from the reference frame 70. In some cases, where there is no differences between the first reference frame (e.g., reference frame 70) and the subsequent ten frames, the sequence of frames may be labeled {RF1, DF11, DF12, DF13, DF14, DF15, N, RF2, DF21, DF22 . . . }. The refresh period N may be selected based on the number of delta frames following the previous reference frame when the video stream is sent across a communication path having a limited bandwidth.

In some cases, the objects detected within each of the video frames, such as the reference frame 70 and the delta frames 79a, 79b, may be decomposed into object attributes. Object attributes may include, for example, a person, a gender, a race, a color of clothing, wearable items (e.g., a hand bag, shoes, a hat, etc.) a gun, a vehicle, a background scene description, and the like. The object attributes may further include the following elements that may further describe the object attributes within the video frames. For example, the elements of the object attributes may include, a unique object identifier (ON), an object description (OD), an object position (OP), an object association with other detected objects in the video frame (OE), and an object size (OS). The object identifier may describe a recognized object identification for reference (e.g., a person, a vehicle, a wearable item, etc.). The object description may further describe the recognized object (e.g., a gender, a type of vehicle, a color and/or type of the wearable item, etc.). The object position may define a position information of the recognized object within the scene, wherein the position information is the relative coordinate information of the quad system of coordinates (e.g., −1, −1 to 1, 1). The object association may define the relationship between the recognized object with one or more other detected objects within the scene, wherein the relationship is derived using the distance/time between the recognized object and the one or more additional detected objects within the scene, and the scene depth. The object size may define the size of the recognized object by deriving the height of the object and/or a number of pixels of the boundary.

A graph model (e.g., a STRG) may be formulated for each video frame and/or scene using both the object identifier and the object relationships. For example, FIG. 7A may include six object identifiers (e.g., recognized objects), such as, the first car 71, the second car 72, the third car 73, the first person 74, the second person 75, and the third person 76. Each object may include an object description, which will be represented as STRG graph edges. The description may be, for example, the third car 73 is a white minivan. Further, the object relationships will be derived between each object within the scene. For example, the first car 71 may be at a position of −0.24, 0.27 and the second car may be at a position of 0.24, 0.32. The delta frames 79a and 79b in FIGS. 7B and 7C may include any changes in the object associations, and any new objects that have entered the scene (e.g., the plurality of new people new people 77, and 78). The associations may be represented as STRG graph nodes and edges, and weights may be captured based upon concrete associations between the edges of the graphs. The graph elements may be continuously built based upon this information, and may be transmitted as metadata to the fast time series store 23. Video data may decouple from the underlying metadata, and multiple graphs may be created for each delta frame (e.g., 79a, 79b) based upon the reference frame (e.g., 70). In some cases, when a video query has been performed, the graphs may be utilized within the video cognitive services 29 to refine the resultant video clip packet reference, which may reduce the time-stamped metadata corresponding to the video stream sent across the communication path having the limited bandwidth.

In some cases, the video management system 10 may generate time-stamped metadata for a second reference video frame (not shown). The second reference video frame may follow the plurality of first delta frames 79a, 79b. The second reference video frame may identify objects detected in the second reference video frame. The video management system 10 may store the time-stamped metadata in the memory. The video management system may further generate time-stamped metadata for each of a plurality of second delta video frames (not shown) following the second reference frame. The time-stamped metadata for each of the plurality of second delta frames may identify changed in the detected objects relative to the objects identified in the time-stamped metadata for the second reference video frame. The video management system 10 may then store the time-stamped metadata in the memory. The time-stamped metadata for the second reference frame and the second delta video frames may be sent across a communication path to the cloud tenant 20 using limited bandwidth.

Figure 8:
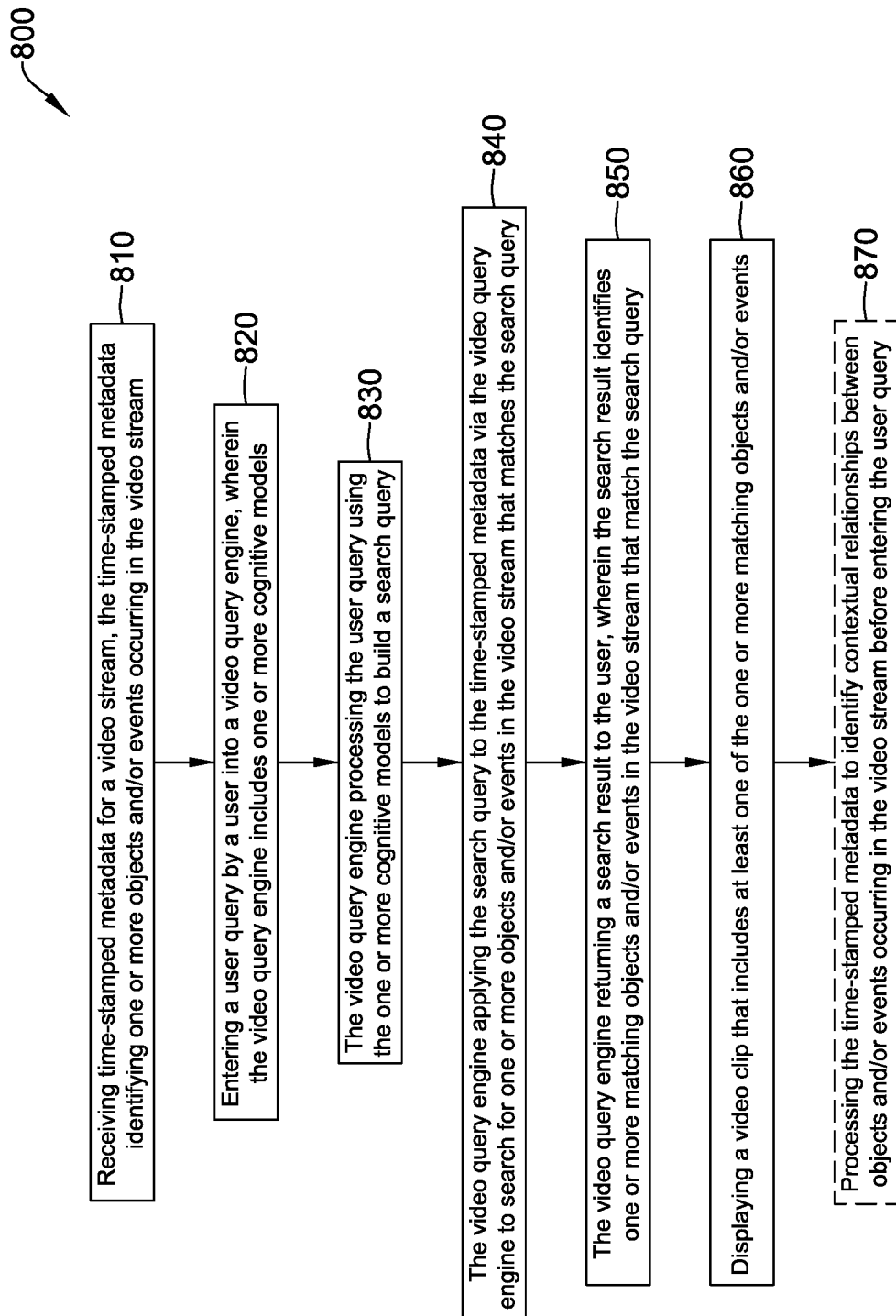
FIG. 8 is a flow diagram showing an illustrative method for searching for one or more objects and/or events in one or more video streams.

FIG. 8 is a flow diagram showing an illustrative method 800 for searching for one or more objects and/or events in one or more video streams. The method 800 may include receiving time-stamped metadata for a video stream, wherein the time-stamped metadata identifies one or more objects and/or events occurring in the video stream, as referenced at block 810. A user may then enter a query into a video query engine, wherein the video query engine includes one or more cognitive models, as referenced at block 820. The video query engine may process the user query using the one or more cognitive models to build a search query, as referenced at block 830, and the video query engine may apply the search query to the time-stamped metadata via the video query engine to search for one or more objects and/or events in the video stream that matches the search query, as referenced at block 840. The video query engine may then return a search result to the user, wherein the search result may identify one or more matching objects and/or events in the video stream that match the search query, as referenced at block 850, and may display a video clip that includes at least one of the one or more matching objects and/or events, as referenced at block 860. The video query engine may further process the time-stamped metadata to identify contextual relationships between objects and/or events occurring in the video stream before entering the user query, as referenced at block 870.

Figure 9:
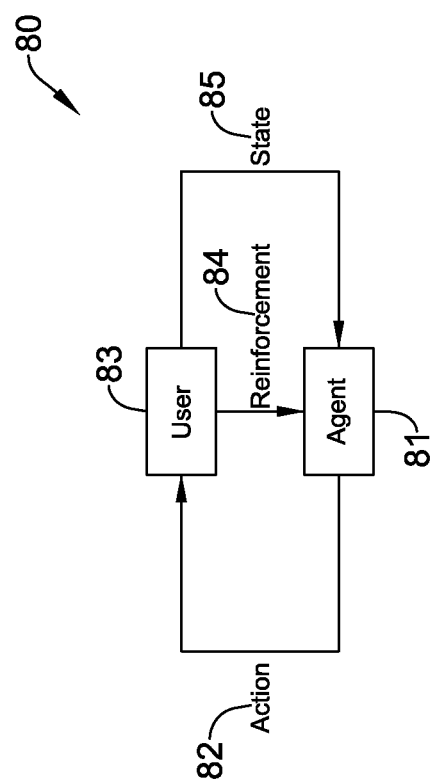
FIG. 9 is a schematic block diagram showing an illustrative method for intelligent machine learning.
Figure 10:
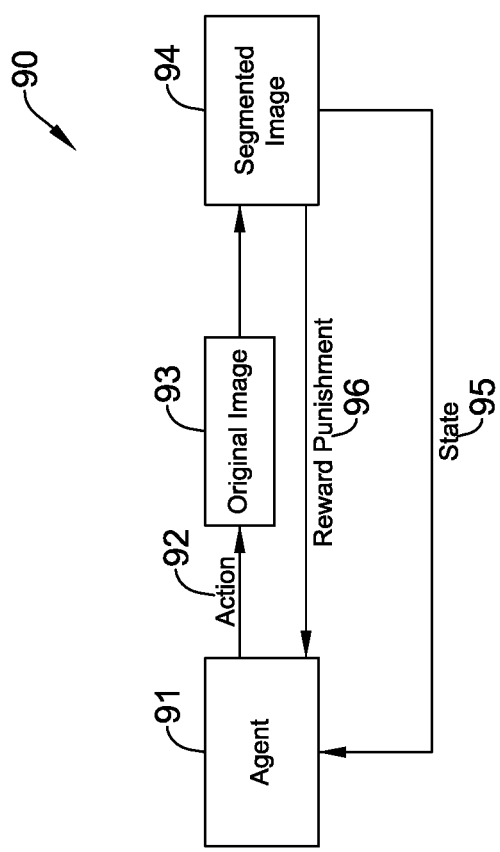
FIG. 10 is a schematic block diagram showing an illustrative method for intelligent machine learning.

FIGS. 9 and 10 are schematic block diagrams showing an illustrative methods 80 and 90, respectively, for intelligent machine learning. As discussed with reference to FIGS. 2 and 3, the video query engine 25 may include the machine learning application 59 and the video cognitive services 29. The video cognitive services 29 may be configured with natural language understanding capabilities, and may be continually updated by the machine learning application 59 using reinforcement learning mechanisms, such as methods 80 and 90, for example. The machine learning application 59 may integrate Bayesian belief tracking and reward-based reinforcement learning methods to derive a user's intent when entering a search query. The intent of the user is considered to be a hidden variable and may be inferred from knowledge of the transition and the observation probabilities of the observed search queries. To derive the hidden variable (e.g., the user's intent), the following equations may be applied:

Let the distribution of the hidden state st−1 at time t−1 be denoted by bt−1(st−1), then the inference problem is to find bt(st) given bt−1, at−1 and ot. This is easily solved using Bayes' rule, $$bt(st) = P(st|ot, at-1, bt-1)$$

$$= p(ot|st)P(st|at-1, bt-1)/p(o|at-1, bt-1)$$

$$= p(ot|st)\Sigma st-1 P(st, st-1|at-1, bt-1)/p(ot|at-1, bt-1)$$

$$= k \cdot p(ot|st)\Sigma st-1 P(st|st-1, at-1)bt-1(st-1), (1)$$

where k=1/p(ot|at−1,bt−−1) is a normalization constant. The distribution of states is often denoted by an N-dimensional vector b=[b(s1), . . . , b(sN)]' called the belief state. The belief update can then be written in matrix form as:

$$bt = k \cdot O(ot)T(at-1)bt-1$$

where T(a) is the N×N transition matrix for action a, and O(o)=diag([p(o|s1), . . . , p(o|sN)]) is a diagonal matrix of observation probabilities. Thus, the computational complexity of a single inference operation is O(N2+3N) including the normalization.

The choice of specific rewards is a design decision and different rewards will result in different policies and differing user experiences. The choice of reward function may also affect the learning rate during policy optimization. However, once the rewards have been fixed, the quality of a policy is measured by the expected total reward over the course of the user interaction:

$$R = E\{\Sigma t=1 T\Sigma sbt(s)r(s,at)\} = E\{t=1 Tr(bt,at)\}$$

If the process is Markovian, the total reward Vπ(b) expected in traversing from any belief state b to the end of the interaction following policy π is independent of all preceding states. Using Bellman's optimality principle, it is possible to compute the optimal value of this value function iteratively:

$V^*(b) = \max a\{r(b,a) + \Sigma op(o|b,a)V^*(\tau(b,a,o))\}$

Where τ(b, a, o) represents the state update function. This iterative optimization is an example of reinforcement learning. This optimal value function for finite interaction sequences is piecewise-linear and convex. It can be represented as a finite set of N-dimensional hyperplanes spanning belief space where each hyperplane in the set has an associated action. This set of hyperplanes also defines the optimal policy since at any belief point b all that is required is to find the hyperplane with the largest expected value V*(b) and select the associated action.

In use, the method 80 shown in FIG. 9 illustrates an agent 81 (e.g., the video query engine 25) that may provide an action 82 (e.g., a search result) to a user 83. In some cases, when the action 82 does not match the search query, the user 83 may provide a reinforcement 84, which may be in the form of feedback, which may include a subsequent user query, to the agent 81. The agent 81 may provide a subsequent action 82 to the user 83. In some cases, when the action 82 (e.g., the search result) matches the search query entered by the user 83, the user 83 may not provide any feedback. Thus, the agent 81 receives a state 85 notification and the agent 81 may store the search query and the action 82 presented for future reference.

The method 90, as shown in FIG. 10, may be similar to the method 80 of FIG. 9. However, the method 90 may differ from the method 80 in that an agent 91 (e.g., the video query engine 25) may apply an action 92 to an original image 93, to produce a segmented image 94. The segmented image 94 may be presented to a user (not shown). In some cases, when the segmented image 94 does not match the search query, the user may provide a reward and/or a punishment 96, which may be in the form of feedback, which may include a subsequent user query, to the agent 91. The agent 91 may provide a subsequent action 92 to the original image 93, thereby producing a second segmented image 94 some cases, when the segmented image 94 matches the search query entered by the user, the user may not provide any reward and/or a punishment 96, Thus, the agent 91 receives a state 95 notification and the agent 91 may store the search query and the segmented image 94 presented for future reference.

Figure 11A:
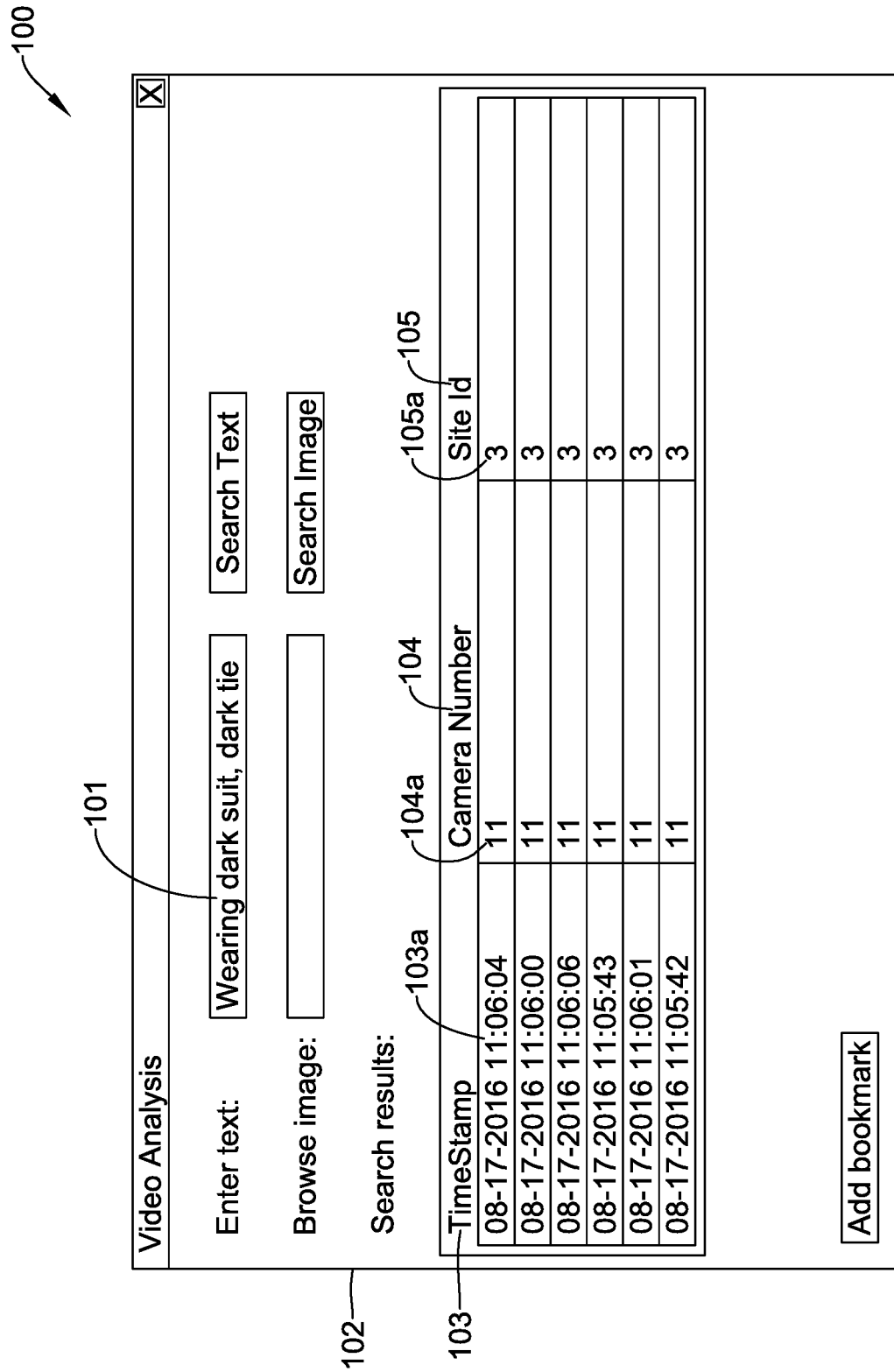
FIG. 11A shows an illustrative screen in which a user may enter a query to search for one or more objects and/or events in one or more video streams.
Figure 11B:
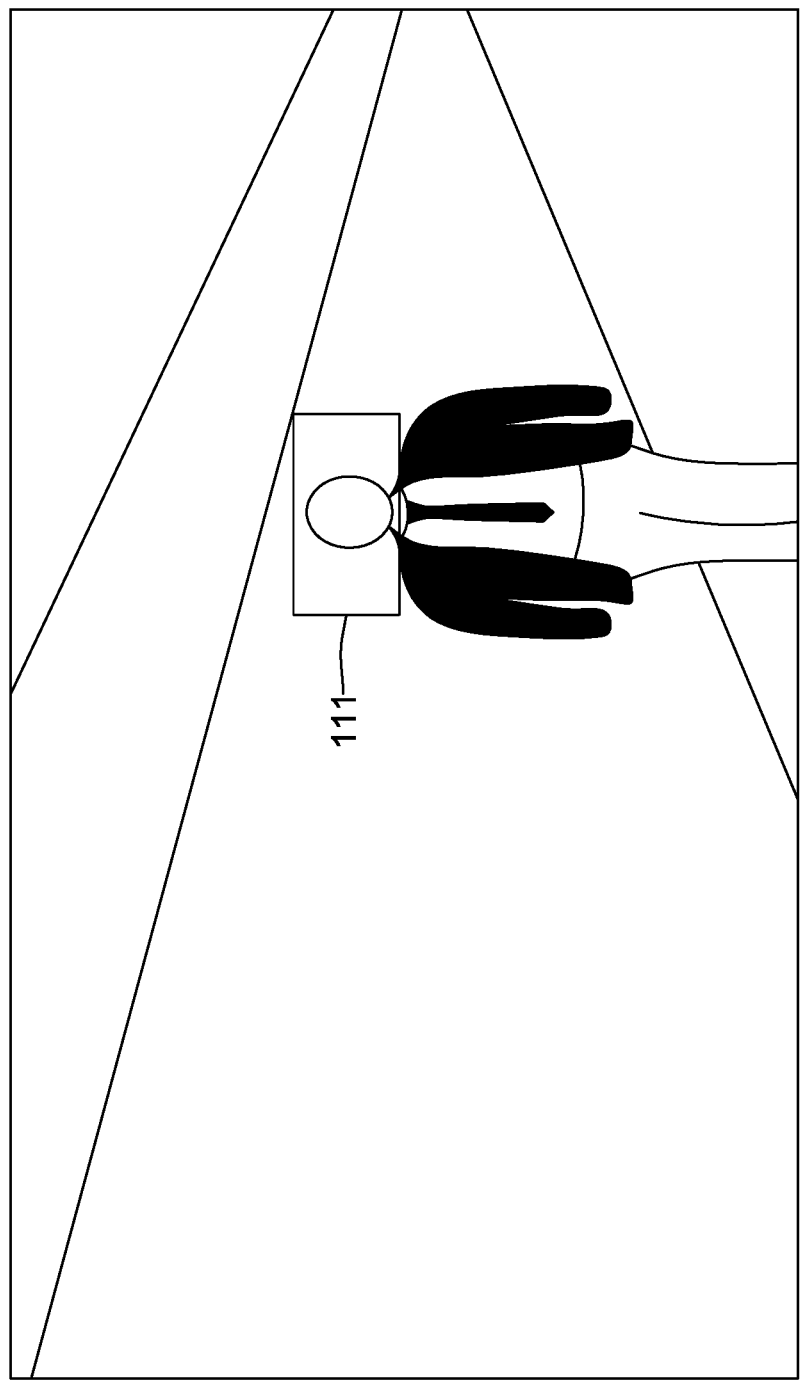
FIG. 11B shows an illustrative output of the query entered in FIG. 11A.

FIGS. 11A and 11B show illustrative screens 100 and 110 respectively, in which a user may enter a query to search for one or more objects and/or events in one or more video streams (e.g., FIG. 11A), and the output of the query entered (e.g., FIG. 11B). As discussed, a user may enter a search query in natural language, as shown in FIG. 11A. For example, the user may enter a search text 101 stating for example, "wearing dark suit, dark tie". The search may enter the video query engine 25 within the cloud tenant 20, and ultimately may provide a search result list 102 to the user. The search result list 102 may include a time-stamp 103, a camera number 104, and a site Id 105. The user may select one of the search results within the search result list 102. In one example, the user may select the first search result within the search result list 102. The first search result may include a time-stamp 103a indicating the video clip is from Aug. 17, 2016 at 11:06:04. The video clip may be received from camera number 11, as indicated by 104a, and site 3, as indicated by 105a. The resultant video clip, as shown in FIG. 11B may include a screen 110 showing a man 111 wearing a dark suit and a dark tie. The user may indicate whether or not the search result matches the search query entered, as discussed with reference to FIGS. 9 and 10. The user may select each of the search results within the search result list 102 to determine which clips are relevant to the entered search query.

In some cases, a link may be provided in the search results. In the example shown, the timestamp 103a may encode a hyperlink that includes an address to the corresponding video stream (Camera Number 11) at a remote site (Remote Site 3) with a reference time that includes the matching object and/or event. The link, when selected by the user, may automatically download the video clip of the video stream that includes the matching object and/or event from the corresponding remote site, and the video clip of the video stream may be displayed on a display for easy using by the user.

Figure 12:
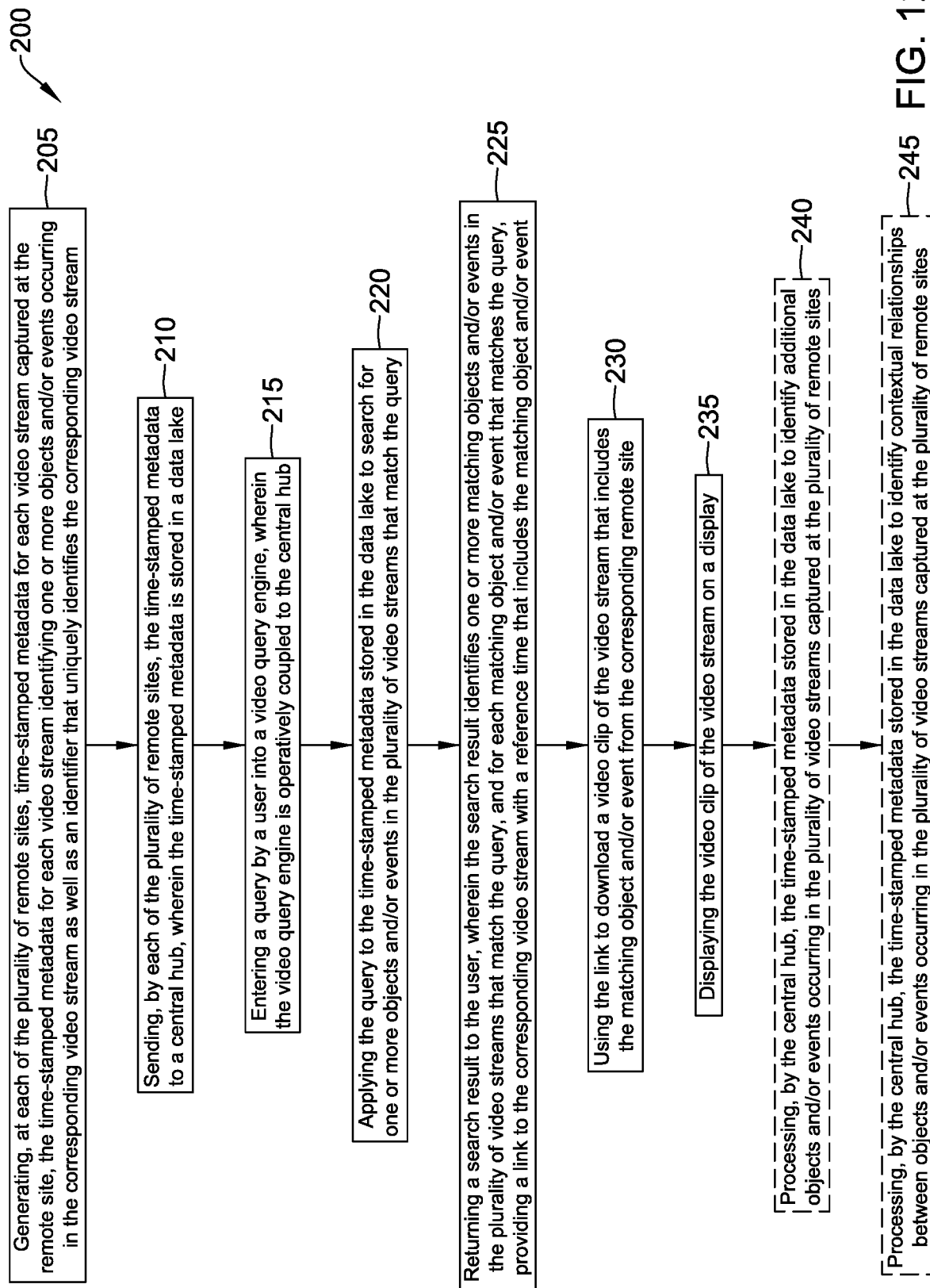
FIG. 12 is a flow diagram showing an illustrative method for searching for one or more events in a plurality of video streams captured and stored at a plurality of remote sites.

FIG. 12 is a flow diagram showing an illustrative method 200 for searching for one or more events in a plurality of video streams captured and stored at a plurality of remote sites. In some cases, the plurality of remote sites may be geographically dispersed. In other cases the plurality of remote sites may be in the same geographic region. The method 200 may include a video management system generating, at each of the plurality of remote sites, time-stamped metadata for each video stream captured at the remote site, wherein the time-stamped metadata for each video stream identifies one or more objects and/or events occurring in the corresponding video stream as well as an identifier that uniquely identifies the corresponding video stream, as referenced at block 205. The identifier that uniquely identifies the corresponding video stream in the time-stamped metadata may include an address, and/or the remote site that stores the corresponding video stream as well as a source of the corresponding video stream.

Each of the plurality of remote sites may send the time-stamped metadata to a central hub, wherein the time-stamped metadata is stored in a data lake, as referenced at block 210. The central hub may be located in the cloud, and may be in communication with the plurality of remote sites via the Internet. A user may enter a query into a video query engine, wherein the video query engine is operatively coupled to the central hub, as referenced at block 215, and the central hub may apply the query to the time-stamped metadata stored in the data lake to search for one or more objects and/or events in the plurality of video streams that match the query, as referenced at block 220. In some cases, the central hub may execute the video query engine. The video query engine may include one or more cognitive models to help derive an inference for the query to aid in identifying relevant search results. In some cases, the inference may be one or more of a user's intent of the query, a user's emotion, a type of situation, a resolution, and a context of the query. The one or more cognitive models may be refined using machine learning over time.

The video management system may return a search result to the user, wherein the search result identifies one or more matching objects and/or events in the plurality of video streams that match the query, and for each matching object and/or event that matches the query, providing a link to the corresponding video stream with a reference time that includes the matching object and/or event, as referenced at block 225. The link may be used to download a video clip of the video stream that includes the matching object and/or event from the corresponding remote site, as referenced at block 230, and the video clip of the video stream may be displayed on a display, as referenced at block 235. In some cases, the link may include a hyperlink or other reference. In some cases, the link may be automatically initiated when the search result is returned to the user, such that the corresponding video clip that includes the matching object and/or event is automatically downloaded from the corresponding remote site that stores the corresponding video stream and displayed on the display. In some cases, the central hub may further process the time-stamped metadata stored in the data lake to identify additional objects and/or events occurring in the plurality of video streams captured at the plurality of remote sites, as referenced at block 240, and the central hub may process the time-stamped metadata stored in the data lake to identify contextual relationships between objects and/or events occurring in the plurality of video streams captured at the plurality of remote sites, as referenced at block 245.

Figure 13:
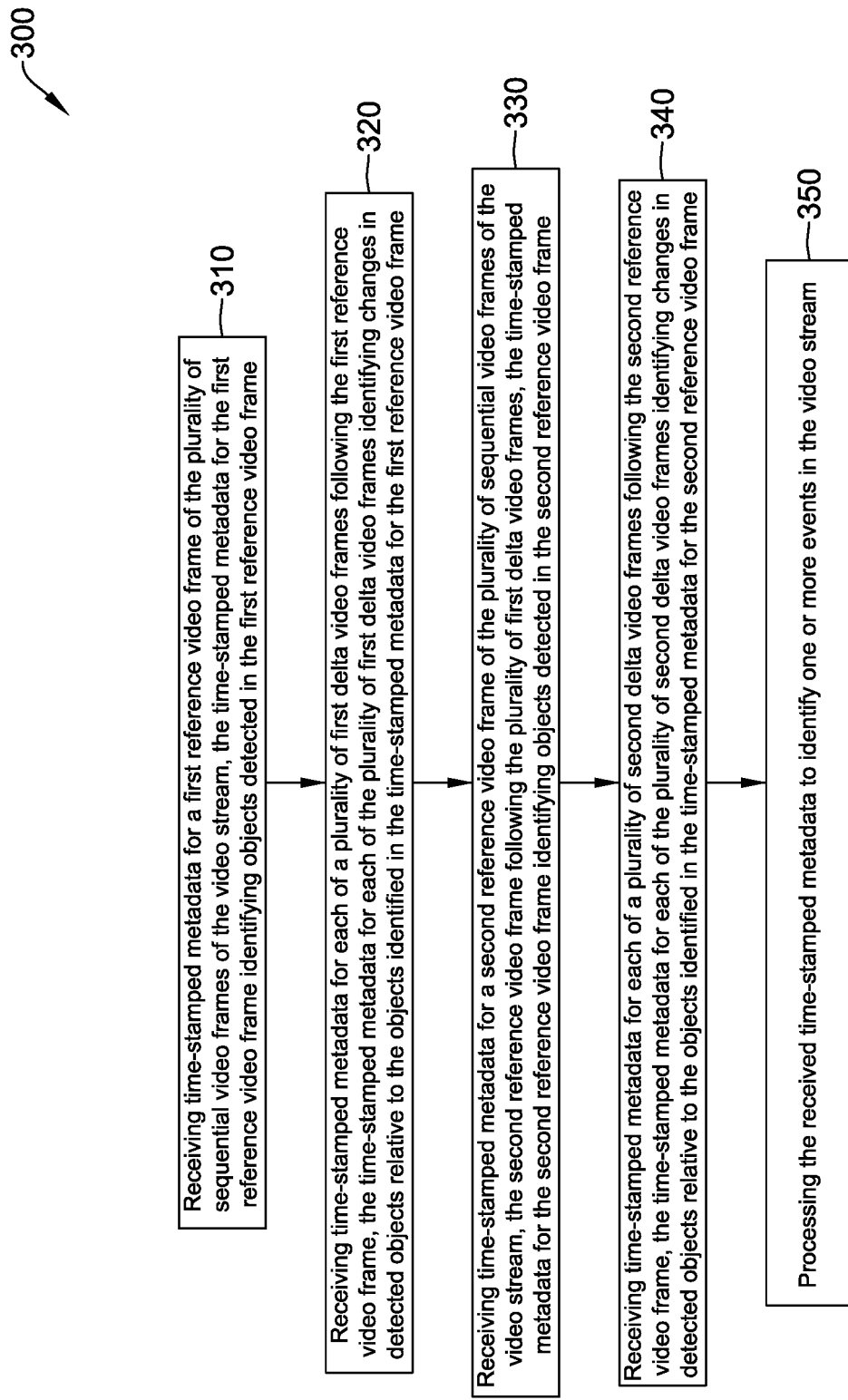
FIG. 13 is a flow diagram showing an illustrative method for receiving time-stamped metadata corresponding to a video stream across a communication path having a limited bandwidth.

FIG. 13 is a flow diagram showing an illustrative method 300 for receiving time-stamped metadata corresponding to a video stream across a communication path having a limited bandwidth. The method 300 may include receiving time-stamped metadata for a first reference video frame of the plurality of sequential video frames of the video stream, wherein the time-stamped metadata for the first reference video frame identifies objects detected in the first reference video frame, as referenced at block 310. The time-stamped metadata for each of a plurality of first delta video frames following the first reference video frame may be received, and the time-stamped metadata for each of the plurality of first delta video frames may identify changes in detected objects relative to the objects identified in the time-stamped metadata for the first reference video frame, as referenced at block 320. The time-stamped metadata for each of the first reference video frame and the plurality of first delta video frames may identify objects and associations between objects identified in the corresponding video frame.

The method 300 may further include receiving time-stamped metadata for a second reference video frame of the plurality of sequential video frames of the video stream, the second reference video frame following the plurality of first delta video frames, the time-stamped metadata for the second reference video frame identifying objects detected in the second reference video frame, as referenced at block 330. The time-stamped metadata for each of a plurality of second delta video frames following the second reference video frame may be received, and the time-stamped metadata for each of the plurality of second delta video frames may identify changes in detected objects relative to the objects identified in the time-stamped metadata for the second reference video frame, as referenced at block 340, and the received time-stamped metadata may be processed to identify one or more events in the video stream, as referenced at block 350.

Figure 14:
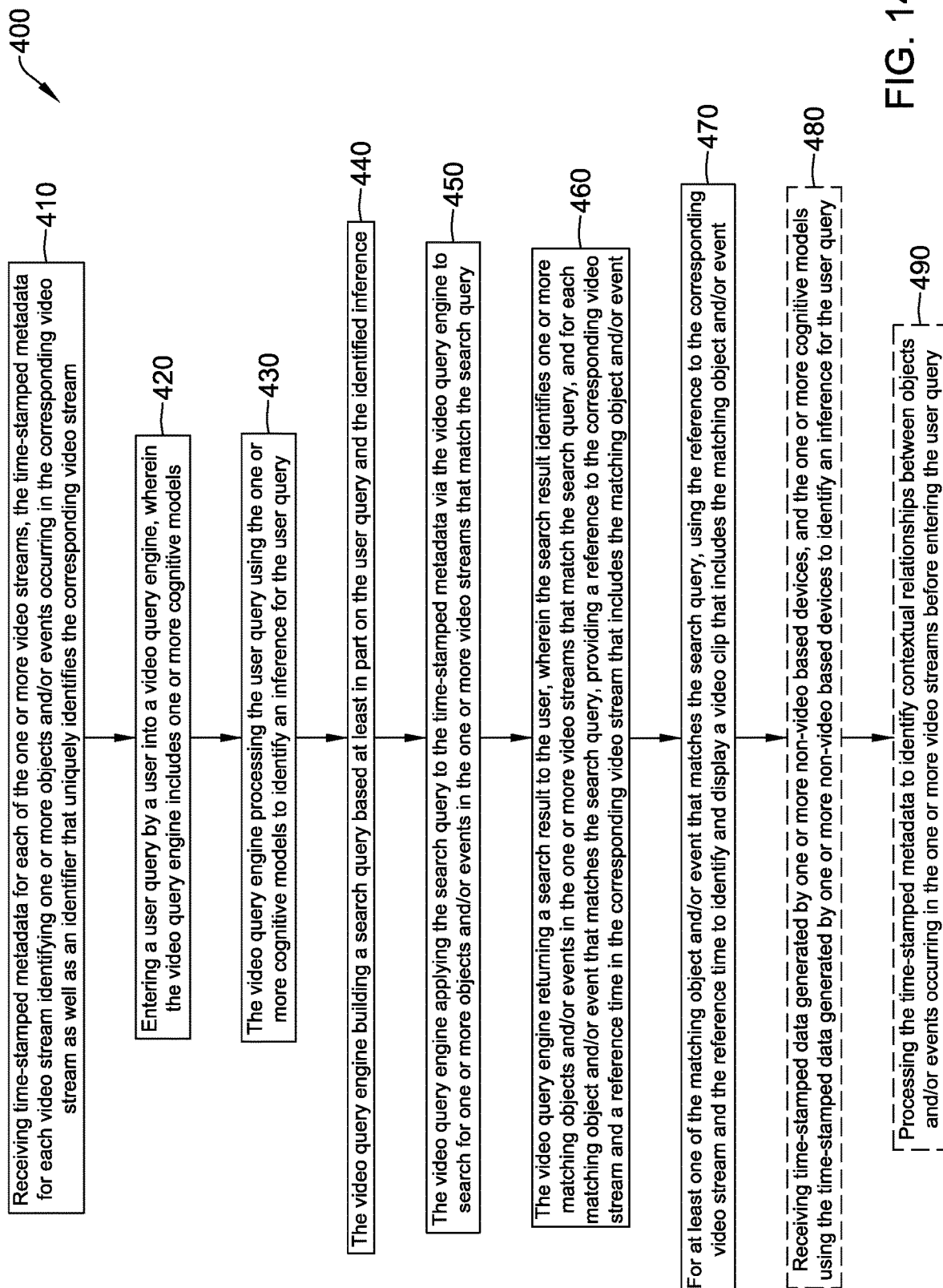
FIG. 14 is a flow diagram showing an illustrative method for searching for one or more objects and/or events in one or more video streams.

FIG. 14 is a flow diagram showing an illustrative method 400 for searching for one or more objects and/or events in one or more video streams. The method 400 may include receiving time-stamped metadata for each of the one or more video streams, the time-stamped metadata for each video stream identifying one or more objects and/or events occurring in the corresponding video stream as well as an identifier that uniquely identifies the corresponding video stream, as referenced at block 410. A user may enter a query into a video query engine, wherein the video query engine includes one or more cognitive models, as referenced at block 420. The one or more cognitive models of the video query engine may be refined using machine learning over time, and in some cases, machine learning over time based on user feedback. The user feedback may include a subsequent user query that is entered after the video query engine returns the search result to the user in order to refine the user query. The video query engine may process the user query using the one or more cognitive models to identify an inference for the user query, as referenced at block 430. The inference may include the a user's intent of the user query, an emotional state of the user that entered the query, a situational context in which the user query was entered, and which entities are the primary objects and/or events of interest to the user that entered the user query.

The video query engine may build a search query based at least in part on the user query and the identified inference, as referenced at block 440, and the video query engine may apply the search query to the time-stamped metadata via the video query engine to search for one or more objects and/or events in the one or more video streams that match the search query, as referenced at block 450. The video query engine may then return a search result to the user, wherein the search result identifies one or more matching objects and/or events in the one or more video streams that match the search query, and for each matching object and/or event that matches the search query, providing a reference to the corresponding video stream and a reference time in the corresponding video stream that includes the matching object and/or event, as referenced at block 460, and for at least one of the matching object and/or event that matches the search query, using the reference to the corresponding video stream and the reference time to identify and display a video clip that includes the matching object and/or event, as referenced at block 470. In some cases, the reference to the corresponding video stream and the reference time may be used to identify and display the video clip that includes the matching object and/or event may be initiated automatically upon the video query engine returning the search result. In some cases, the reference to the corresponding video stream and the reference time may be used to identify and display the video clip that includes the matching object and/or event may be initiated manually by a user after the video query engine returns the search result.

The method 400 may further include receiving time-stamped data generated by one or more non-video based devices, such as, for example, one or more security sensors, and the one or more cognitive models using the time-stamped data generated by one or more non-video based devices to identify an inference for the user query, as referenced at block 480. The one or more cognitive models may use the time-stamped data generated by the one or more non-video based devices and time-stamped metadata for one or more video streams to identify the inference for the user query. The method 400 may include processing the time-stamped metadata to identify contextual relationships between objects and/or events occurring in the one or more video streams before entering the user query, as referenced at block 490.

ADDITIONAL EMBODIMENTS

In one example, the plurality of remote sites may be geographically dispersed sites.

Alternatively, or in addition, the central hub may be in the cloud and is in communication with the plurality of remote sites via the Internet.

Alternatively, or in addition, the central hub may execute the video query engine.

Alternatively, or in addition, by the central hub may process the time-stamped metadata stored in the data lake to identify additional objects and/or events occurring in the plurality of video streams captured at the plurality of remote sites.

Alternatively, or in addition, the central hub may process the time-stamped metadata stored in the data lake to identify contextual relationships between objects and/or events occurring in the plurality of video streams captured at the plurality of remote sites.

Alternatively, or in addition, the video query engine may include one or more cognitive models to derive an inference for the query to aid in identifying relevant search results.

Alternatively, or in addition, the inference may be one of a user's intent of the query, a user's emotion, a type of user, a type of situation, a resolution, and a context of the query.

Alternatively, or in addition, the one or more cognitive models may be refined using machine learning over time.

Alternatively, or in addition, the identifier that uniquely identifies the corresponding video stream in the time-stamped metadata may include an address.

Alternatively, or in addition, the identifier that uniquely identifies the corresponding video stream in the time-stamped metadata may identify the remote site that stores the corresponding video stream as well as a source of the corresponding video stream.

Alternatively, or in addition, the link may include a hyperlink or a reference.

Alternatively, or in addition, the link may be automatically initiated when the search result is returned to the user, such that the corresponding video clip that includes the matching object and/or event may be automatically downloaded from the corresponding remote site that stores the corresponding video stream and displayed on the display.

Alternatively, or in addition, the central hub may be in the cloud and may be in communication with the plurality of remote sites via the Internet.

Alternatively, or in addition, the one or more processors may be further configured to process the time-stamped metadata stored in the memory to identify additional objects and/or events occurring in the plurality of video streams captured at the plurality of remote sites.

Alternatively, or in addition, the central hub may execute a video query engine that may include one or more cognitive models to derive an inference for the query to aid in identifying relevant search results.

Alternatively, or in addition, the request may include the identifier that uniquely identifies the corresponding video stream.

Alternatively, or in addition, the time-stamped metadata for each of the first reference video frame and each of the plurality of first delta video frames may identify objects and associations between objects identified in the corresponding video frame.

Alternatively, or in addition, the associations between objects may include a distance between objects.

Alternatively, or in addition, the associations between objects may be represented using a Spatial Temporal Regional Graph (STRG) in the time-stamped metadata.

Alternatively, or in addition, for each detected object, the time-stamped metadata may identify a unique object identifier along with one or more of an object description, an object position, and an object size.

Alternatively, or in addition, the time-stamped metadata for each of the plurality of first delta video frames may identify changes in detected objects relative to the objects identified in the time-stamped metadata for the first reference video frame by identifying a change in an objects position, size, and/or association with one or more other detected objects.

Alternatively, or in addition, for each detected object, the time-stamped metadata may identify a unique object identifier along with one or more of an object description, an object position, an object size, and an association with one or more other detected objects.

Alternatively, or in addition, the time-stamped metadata for each of the plurality of first delta video frames may identify a change in detected objects relative to the objects identified in the time-stamped metadata for the first reference video frame by identifying a new object that is not present in the first reference video frame.

Alternatively, or in addition, the number of the plurality of first delta video frames following the first reference video frame and the number of the plurality of second delta video frames following the second reference video frame may be the same.

Alternatively, or in addition, the number of the plurality of first delta video frames following the first reference video frame and the number of the plurality of second delta video frames following the second reference video frame may be different.

Alternatively, or in addition, the number of the plurality of first delta video frames following the first reference video frame may be dependent on an amount of time-stamped metadata generated for each of the plurality of first delta video frames relative to an expected size of the time-stamped metadata if a new reference video frame were taken.

Alternatively, or in addition, the time-stamped metadata for each of the first reference video frame and each of the plurality of first delta video frames may identify objects and associations between objects identified in the corresponding video frame.

Alternatively, or in addition, the associations between objects may include a distance between objects.

Alternatively, or in addition, the associations between objects may be represented using a Spatial Temporal Regional Graph (STRG) in the time-stamped metadata.

Alternatively, or in addition, for each detected object, the time-stamped metadata may identify a unique object identifier along with one or more of an object description, an object position, and an object size.

Alternatively, or in addition, the time-stamped metadata for each of the plurality of first delta video frames may identify changes in detected objects relative to the objects identified in the time-stamped metadata for the first reference video frame by identifying a change in an objects position, size, and/or association with one or more other detected objects.

Alternatively, or in addition, for each detected object, the time-stamped metadata may identify a unique object identifier along with one or more of an object description, an object position, an object size, and an association with one or more other detected objects.

Alternatively, or in addition, the time-stamped metadata for each of the first reference video frame and each of the plurality of first delta video frames may identify objects and associations between objects identified in the corresponding video frame.

Alternatively, or in addition, the inference may be to a user's intent of the user query.

Alternatively, or in addition, the inference may be to an emotional state of the user that entered the user query.

Alternatively, or in addition, the inference may be to a situational context in which the user query was entered.

Alternatively, or in addition, the inference may be to which entities are the primary objects and/or events of interest to the user that entered the user query.

Alternatively, or in addition, the one or more cognitive models of the video query engine may be refined using machine learning over time.

Alternatively, or in addition, the one or more cognitive models of the video query engine may be refined using machine learning over time based on user feedback.

Alternatively, or in addition, the user feedback may include a subsequent user query that is entered after the video query engine returns the search result to the use in order to refine the user query.

Alternatively, or in addition, time-stamped data generated by one or more non-video based devices may be received, and the one or more cognitive models using the time-stamped data generated by one or more non-video based devices may identify an inference for the user query.

Alternatively, or in addition, the one or more cognitive models may use the time-stamped data generated by one or more non-video based devices and time-stamped metadata for one or more of the one or more video streams to identify an inference for the user query.

Alternatively, or in addition, one or more non-video based devices may include one or more security sensors.

Alternatively, or in addition, processing the time-stamped metadata may identify contextual relationships between objects and/or events occurring in the one or more video streams before entering the user query.

Alternatively, or in addition, using the reference to the corresponding video stream and the reference time to identify and display the video clip that includes the matching object and/or event may be initiated automatically upon the video query engine returning the search result.

Alternatively, or in addition, using the reference to the corresponding video stream and the reference time to identify and display the video clip that includes the matching object and/or event may be initiated manually by a user after the video query engine returns the search result.

Alternatively, or in addition, the one or more cognitive models of the video query engine may be refined using machine learning over time.

Alternatively, or in addition, the one or more cognitive models of the video query engine may be refined using machine learning over time based on user feedback, wherein the user feedback may include a subsequent user query that is entered after the video query engine returns the search result to the use in order to refine the user query.

Alternatively, or in addition, the inference may be to one or more of: a user's intent of the user query, an emotional state of the user that entered the user query, a situational context in which the user query was entered, and which entities are the primary objects and/or events of interest to the user that entered the user query.

Alternatively, or in addition, processing the time-stamped metadata to identify contextual relationships between objects and/or events occurring in the video stream before entering the user query.

All numbers are herein assumed to be modified by the term "about", unless the content clearly dictates otherwise. The recitation of numerical ranged by endpoints includes all numbers subsumed within that range (e.g., 1 to 5 includes, 1, 1.5, 2, 2.75, 3, 3.8, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for sending time-stamped metadata corresponding to a video stream across a communication path having a limited bandwidth, the video stream including a plurality of sequential video frames, the method comprising:

generating time-stamped metadata for a first reference video frame of the plurality of sequential video frames of the video stream, the time-stamped metadata for the first reference video frame identifying objects detected in the first reference video frame;

sending the time-stamped metadata for the first reference video frame across the communication path;

generating time-stamped metadata for each of a plurality of first delta video frames following the first reference video frame, the time-stamped metadata for each of the plurality of first delta video frames identifying changes in detected objects relative to the objects identified in the time-stamped metadata for the first reference video frame;

sending the time-stamped metadata for each of the plurality of first delta video frames across the communication path;

generating time-stamped metadata for a second reference video frame of the plurality of sequential video frames of the video stream, the second reference video frame following the plurality of first delta video frames, the time-stamped metadata for the second reference video frame identifying objects detected in the second reference video frame;

sending the time-stamped metadata for the second reference video frame across the communication path;

generating time-stamped metadata for each of a plurality of second delta video frames following the second reference video frame, the time-stamped metadata for each of the plurality of second delta video frames identifying changes in detected objects relative to the objects identified in the time-stamped metadata for the second reference video frame; and sending the time-stamped metadata for each of the plurality of second delta video frames across the communication path.

2. The method of claim 1, wherein the time-stamped metadata for each of the first reference video frame and each of the plurality of first delta video frames identifies objects and associations between objects identified in the corresponding video frame.

3. The method of claim 2, wherein the associations between objects includes a distance between objects.

4. The method of claim 2, wherein the associations between objects are represented using a Spatial Temporal Regional Graph (STRG) in the time-stamped metadata.

5. The method of claim 1, wherein for each detected object, the time-stamped metadata identifies an unique object identifier along with one or more of an object description, an object position, and an object size.

6. The method of claim 5, wherein the time-stamped metadata for each of the plurality of first delta video frames identifies changes in detected objects relative to the objects identified in the time-stamped metadata for the first reference video frame by identifying a change in an objects position, size, and/or association with one or more other detected objects.

7. The method of claim 1, wherein for each detected object, the time-stamped metadata identifies an unique object identifier along with one or more of an object description, an object position, an object size, and an association with one or more other detected objects.

8. The method of claim 7, wherein the time-stamped metadata for each of the plurality of first delta video frames identifies a change in detected objects relative to the objects identified in the time-stamped metadata for the first reference video frame by identifying a new object that is not present in the first reference video frame.

9. The method of claim 1, wherein the number of the plurality of first delta video frames following the first reference video frame and the number of the plurality of second delta video frames following the second reference video frame are the same.

10. The method of claim 1, wherein the number of the plurality of first delta video frames following the first reference video frame and the number of the plurality of second delta video frames following the second reference video frame are different.

11. The method of claim 10, wherein the number of the plurality of first delta video frames following the first reference video frame is dependent on an amount of time-stamped metadata generated for each of the plurality of first delta video frames relative to an expected size of the time-stamped metadata if a new reference video frame were taken.

12. A video processing system for sending time-stamped metadata corresponding to a video stream across a communication path having a limited bandwidth, the video stream including a plurality of sequential video frames, the video processing system comprising:
a memory;
one or more processor operatively coupled to the memory, the one or more processors configured to:
generate time-stamped metadata for a first reference video frame of the plurality of sequential video frames of the video stream, the time-stamped metadata for the first reference video frame identifying objects detected in the first reference video frame;
store the time-stamped metadata for the first reference video frame in the memory;
send the time-stamped metadata for the first reference video frame across the communication path;
generate time-stamped metadata for each of a plurality of first delta video frames following the first reference video frame, the time-stamped metadata for each of the plurality of first delta video frames identifying changes in detected objects relative to the objects identified in the time-stamped metadata for the first reference video frame;
store the time-stamped metadata for each of the plurality of first delta video frames in the memory;
send the time-stamped metadata for each of the plurality of first delta video frames across the communication path;
generate time-stamped metadata for a second reference video frame of the plurality of sequential video frames of the video stream, the second reference video frame following the plurality of first delta video frames, the time-stamped metadata for the second reference video frame identifying objects detected in the second reference video frame;
store the time-stamped metadata for the second reference video frame in the memory;
send the time-stamped metadata for the second reference video frame across the communication path;
generate time-stamped metadata for each of a plurality of second delta video frames following the second reference video frame, the time-stamped metadata for each of the plurality of second delta video frames identifying changes in detected objects relative to the objects identified in the time-stamped metadata for the second reference video frame;
store the time-stamped metadata for each of the plurality of second delta video frames in the memory; and
send the time-stamped metadata for each of the plurality of second delta video frames across the communication path.

13. The video processing system of claim 12, wherein the time-stamped metadata for each of the first reference video frame and each of the plurality of first delta video frames identifies objects and associations between objects identified in the corresponding video frame.

14. The video processing system of claim 13, wherein the associations between objects includes a distance between objects.

15. The video processing system of claim 13, wherein the associations between objects are represented using a Spatial Temporal Regional Graph (STRG) in the time-stamped metadata.

16. The video processing system of claim 12, wherein for each detected object, the time-stamped metadata identifies an unique object identifier along with one or more of an object description, an object position, and an object size.

17. The video processing system of claim 16, wherein the time-stamped metadata for each of the plurality of first delta video frames identifies changes in detected objects relative to the objects identified in the time-stamped metadata for the first reference video frame by identifying a change in an objects position, size, and/or association with one or more other detected objects.

18. The video processing system of claim 12, wherein for each detected object, the time-stamped metadata identifies an unique object identifier along with one or more of an object description, an object position, an object size, and an association with one or more other detected objects.

19. A method for receiving time-stamped metadata corresponding to a video stream across a communication path having a limited bandwidth, the video stream including a plurality of sequential video frames, the method comprising:
receiving time-stamped metadata for a first reference video frame of the plurality of sequential video frames of the video stream, the time-stamped metadata for the first reference video frame identifying objects detected in the first reference video frame;

receiving time-stamped metadata for each of a plurality of first delta video frames following the first reference video frame, the time-stamped metadata for each of the plurality of first delta video frames identifying changes in detected objects relative to the objects identified in the time-stamped metadata for the first reference video frame;

receiving time-stamped metadata for a second reference video frame of the plurality of sequential video frames of the video stream, the second reference video frame following the plurality of first delta video frames, the time-stamped metadata for the second reference video frame identifying objects detected in the second reference video frame;

receiving time-stamped metadata for each of a plurality of second delta video frames following the second reference video frame, the time-stamped metadata for each of the plurality of second delta video frames identifying changes in detected objects relative to the objects identified in the time-stamped metadata for the second reference video frame; and processing the received time-stamped metadata to identify one or more events in the video stream.

20. The method of claim 19, wherein the time-stamped metadata for each of the first reference video frame and each of the plurality of first delta video frames identifies objects and associations between objects identified in the corresponding video frame.

* * * * *